(12) United States Patent
Ando et al.

(10) Patent No.: US 6,338,139 B1
(45) Date of Patent: Jan. 8, 2002

(54) INFORMATION REPRODUCING APPARATUS, AUTHENTICATING APPARATUS, AND INFORMATION PROCESSING SYSTEM

(75) Inventors: Hideo Ando, Tokyo; Masaki Nakagawa, Zama; Yoshiyuki Ishizawa; Tadashi Kojima, both of Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/121,894

(22) Filed: Jul. 24, 1998

(30) Foreign Application Priority Data

Jul. 24, 1997 (JP) .............................................. 9-198638

(51) Int. Cl.⁷ ............................................... G06F 11/30
(52) U.S. Cl. ......................... 713/168; 713/169; 380/28; 380/281
(58) Field of Search ................... 380/281, 28; 713/151, 713/168, 169

(56) References Cited

U.S. PATENT DOCUMENTS 5,933,829 A * 8/1999 Durst et al. ................... 707/10

OTHER PUBLICATIONS

Freier et al., The SSL Protocol Version 3.0, Nov. 18, 1996, IETF, Transport Layer Security Working Group.*
Menezes et al., Handbook of Applied Cryptography, 1997, CRC Press, pp. 515, 516.*

* cited by examiner

Primary Examiner—Thomas R. Peeso
(74) Attorney, Agent, or Firm—Pillsbury Winthrop LLP

(57) ABSTRACT

In this invention, an information recording/reproducing apparatus has an authentication function and directly transfers information to an MPEG board, sub-picture run-length board, speech coding/decoding board without using a main CPU. Thus, information transfer between the information recording/reproducing apparatus and various processing boards can be performed without using a main controller, the load of the main CPU can be alleviated and the main CPU can perform another process during the information transfer period.

5 Claims, 11 Drawing Sheets

| STREAM KEY INFORMATION 31 CORRESPONDING TO INFORMATION a | STREAM KEY INFORMATION 32 CORRESPONDING TO INFORMATION b | STREAM KEY INFORMATION 33 CORRESPONDING TO INFORMATION c | STREAM KEY INFORMATION 34 CORRESPONDING TO INFORMATION d |
|---|---|---|---|
| FIRST AREA KEY INFORMATION 35 | SECOND AREA KEY INFORMATION 36 | THIRD AREA KEY INFORMATION 37 | FOURTH AREA KEY INFORMATION 38 |
| | TIMELY TIME-CHANGING INFORMATION 39 GENERATED FROM RANDOM SIGNAL GENERATOR | | |
| AGID NUMBER (AGID=0) 40 | AGID NUMBER (AGID=1) 41 | AGID NUMBER (AGID=2) 42 | AGID NUMBER (AGID=3) 43 |
| CHALLENGE KEY INFORMATION (AGID=0) 45 ISSUED FROM THE OTHER PARTY | CHALLENGE KEY INFORMATION (AGID=1) 46 ISSUED FROM THE OTHER PARTY | CHALLENGE KEY INFORMATION (AGID=2) 47 ISSUED FROM THE OTHER PARTY | CHALLENGE KEY INFORMATION (AGID=3) 48 ISSUED FROM THE OTHER PARTY |
| CHALLENGE KEY INFORMATION (AGID=0) 51 ISSUED FROM ITS OWN SIDE | CHALLENGE KEY INFORMATION (AGID=1) 52 ISSUED FROM ITS OWN SIDE | CHALLENGE KEY INFORMATION (AGID=2) 53 ISSUED FROM ITS OWN SIDE | CHALLENGE KEY INFORMATION (AGID=3) 54 ISSUED FROM ITS OWN SIDE |
| OBFUSCATION KEY 1 INFORMATION (AGID=0) 55 ISSUED FROM ITS OWN SIDE | OBFUSCATION KEY 1 INFORMATION (AGID=1) 56 ISSUED FROM ITS OWN SIDE | OBFUSCATION KEY 1 INFORMATION (AGID=2) 57 ISSUED FROM ITS OWN SIDE | OBFUSCATION KEY 1 INFORMATION (AGID=3) 58 ISSUED FROM ITS OWN SIDE |

F I G. 6A

| OBFUSCATION KEY 2 INFORMATION (AGID=0) 60 ISSUED FROM THE OTHER PARTY | OBFUSCATION KEY 2 INFORMATION (AGID=1) 61 ISSUED FROM THE OTHER PARTY | OBFUSCATION KEY 2 INFORMATION (AGID=2) 62 ISSUED FROM THE OTHER PARTY | OBFUSCATION KEY 2 INFORMATION (AGID=3) 63 ISSUED FROM THE OTHER PARTY |
|---|---|---|---|
| BUS KEY INFORMATION (AGID=0) 65 | BUS KEY INFORMATION (AGID=1) 66 | BUS KEY INFORMATION (AGID=2) 67 | BUS KEY INFORMATION (AGID=3) 68 |
| AGID TRANSMISSION COMPLETION INFORMATION (AGID=0) 70 | AGID TRANSMISSION COMPLETION INFORMATION (AGID=1) 71 | AGID TRANSMISSION COMPLETION INFORMATION (AGID=2) 72 | AGID TRANSMISSION COMPLETION INFORMATION (AGID=3) 73 |
| CHALLEGE KEY RECEPTION COMPLETION INFORMATION (AGID=0) 75 | CHALLEGE KEY RECEPTION COMPLETION INFORMATION (AGID=1) 76 | CHALLEGE KEY RECEPTION COMPLETION INFORMATION (AGID=2) 77 | CHALLEGE KEY RECEPTION COMPLETION INFORMATION (AGID=3) 78 |
| OBFUSCATION KEY 1 TRANSMISSION COMPLETION INFORMATION (AGID=0) 80 | OBFUSCATION KEY 1 TRANSMISSION COMPLETION INFORMATION (AGID=1) 81 | OBFUSCATION KEY 1 TRANSMISSION COMPLETION INFORMATION (AGID=2) 82 | OBFUSCATION KEY 1 TRANSMISSION COMPLETION INFORMATION (AGID=3) 83 |
| CHALLEGE KEY TRANSMISSION COMPLETION INFORMATION (AGID=0) 85 | CHALLEGE KEY TRANSMISSION COMPLETION INFORMATION (AGID=1) 86 | CHALLEGE KEY TRANSMISSION COMPLETION INFORMATION (AGID=2) 87 | CHALLEGE KEY TRANSMISSION COMPLETION INFORMATION (AGID=3) 88 |
| OBFUSCATION KEY 2 RECEPTION COMPLETION INFORMATION (AGID=0) 90 | OBFUSCATION KEY 2 RECEPTION COMPLETION INFORMATION (AGID=1) 91 | OBFUSCATION KEY 2 RECEPTION COMPLETION INFORMATION (AGID=2) 92 | OBFUSCATION KEY 2 RECEPTION COMPLETION INFORMATION (AGID=3) 93 |

F I G. 6B

INFORMATION REPRODUCING APPARATUS, AUTHENTICATING APPARATUS, AND INFORMATION PROCESSING SYSTEM

BACKGROUND OF THE INVENTION

This invention relates to an information reproducing apparatus for reproducing information recorded on an information recording medium, an authenticating apparatus for effecting the authentication process, and an information processing system for transferring information by effecting the mutual authentication between a first apparatus and a plurality of second apparatuses.

Conventionally, an apparatus for reproducing information mixedly containing video information, audio information and still picture information recorded on an optical disk such as a DVD by use of an optical disk device is realized. Information reproduced by the optical disk device is processed by a processing circuit according to the type of information.

For example, if information contains MPEG video data, audio data (PCM, AC3), sub-picture data, navigation data and the like, information is processed by processing boards corresponding to the respective data items.

In this case, the main controller temporarily fetches data items and distributes the fetched data items-to the respective processing boards according to the types of the data items.

In this case, in a period of data distribution, the main controller is occupied. Therefore, if the amount of information reproduced from the optical disk device becomes large, the load of the main controller is increased and the main controller cannot effect other processes for a long period of time.

Further, conventionally, as a bidirectional subject authentication method known as the encoding (obfuscating) technique, a method using an electronic signature by use of a public key(asymmetric key) such as an RSA (public key encryption algorithm) is well known.

For example, the following methods are well known.

1] "A" transmits a random character to "B" as "challenge".

2] "B" signs the character with the public key which "B" has and sends back the character to "A" as "report". "A" inquires of an authentication station (CA center) which is a third party storing the public key of "B" and decodes (deciphers) information returned from "B" by use of the public key from the authentication station. If the result of decipher coincides with the character which "A" first transmitted, "B" is identified as the person himself.

3] "B" transmits a random character to "A" as "challenge".

4] "A" signs the character with the public key which "A" has and sends back the character to "B" as "report". "B" inquires of an authentication station (CA center) which is a third party storing the public key of "A" and decodes (deciphers) information returned from "A" by use of the public key from the authentication station. If the result of decipher coincides with the character which "B" first transmitted, "A" is identified as the person himself.

However, with the above method, the third party (authentication station (CA center)) storing the public key is required, it is necessary to inquire of the authentication station (CA center) which is the third party storing the public key by communication at each time of bidirectional subject authentication, and thus the process becomes extremely complicated.

Further, when the public key which the third party manages is used, the public key tends to be stolen and the security protection is difficult.

A method for mutually exchanging encoding (obfuscating) keys is known in the prior art, but the way the mutually exchanged encoding keys are used is little known except a case wherein the encoding key is used to encode transfer information.

Further, with the above method, when the place in which the other party to be authenticated is previously known, information to be transmitted is determined, and the other party to whom information is transmitted (to be authenticated) is searched for, the above method cannot be used. That is, conventionally, no effective method is proposed for a method for searching for the other party to be authenticated.

BRIEF SUMMARY OF THE INVENTION

This invention can transfer data between an information reproducing apparatus and processing boards without using a main controller and can alleviate the load of the main controller and thus the main controller can effect other processes during the information transferring period.

Further, this invention can effect the encoding (obfuscating)/decoding (deciphering) process in an extremely simple construction.

This invention can easily effect the mutual authentication operation without using a third party which manages public keys, that is, this invention can make it unnecessary to use the third party or inquire of the third party and can effect the mutual authentication operation extremely easily with high reliability.

Further, this invention can prevent leak of information with reliability extremely higher than a case wherein the public key system is used by further obfuscating an obfuscating key by use of the transferred obfuscating key.

In this invention, an authentication object (which is to be authenticated) is identified based on information (stream ID) indicating the type of information attached to information transmitted from the information recording medium, each authentication object is authenticated, then information can be distributed (transmitted) to the authentication objects in parallel, and as a result, the load of the authentication object is relatively alleviated and information can be displayed on the display screen in a short period of time after reproduction of information from the information recording medium is started, and time lag can be suppressed to minimum.

In this invention, the authentication object can be searched for based on information to be transmitted, and the authentication object can be searched for by use of the relatively simple method by supplying information to candidates of the authentication object, causing the candidates to send back responses and effecting the mutual authentication operation based on the results of responses.

Further, in this invention, since an obfuscating information storing memory provided in an authentication functional section, information can be arranged in order by using a clock which is independent from the memory. Since obfuscated information is previously recorded on an external transfer data storing section by use of the clock inherent to the authenticating functional section, a data transfer interface section can record/reproduce information with respect to the external transfer data storing section at an optimum timing according to the state of the transmission line. By temporarily storing obfuscated information transferred with respect to the exterior in the external transfer data storing section and independently forming obfuscated information according to the inherent clock provided in the interior, the adaptability at the time of protocol conversion and the flexibility for the busy condition of the external communication line can be enhanced.

Further, in this invention, by previously storing an area key and stream key in the authentication information storing section and using the information for the authentication process, it becomes unnecessary to use the third party such as an authentication station (CA center) or inquire of the third party and the mutual authentication operation can be extremely easily effected with high reliability.

Further, in this invention, since only a client (IP address or telephone number thereof) to or by whom information is distributed or collected and the content of the information to be distributed or collected are informed from the server and the other processes are left to the information reproducing apparatus, no load is imposed on the main CPU during the information transfer and the main CPU can effect the other process during the information transfer so that the high speed process can be attained as a whole system. Further, since information is input/output via the network communication between the computer and the information reproducing apparatus, the information reproducing apparatus can be placed at a far distance from the computer, and as a result, the computer can be installed in a small space.

In this invention, since the information reproducing apparatus has a communication function, the information input/output process can be attained between the information reproducing apparatuses during the communication if a communication LAN card or modem card is used in a small PC such as a small note PC having only one PCMCIA card slot. Further, since obfuscated information can be transmitted to the information reproducing apparatus having an authentication function, neither copying of information nor leakage of information in the communication path will occur.

Not only the communication functional section is provided but also the authentication functional section is provided to effect mutual authentication with respect to the authentication object by use of the communication function of the communication functional section and transmit obfuscated information so that information leakage by copying information during the network communication can be prevented and the high-level security can be attained.

Further, in this invention, by storing the authentication histories of a plurality of authentication objects in the memory, the authentication processes can be simultaneously effected for and obfuscated information can be simultaneously transmitted to a plurality of authentication objects by use of the time-sharing processing method, and an authentication object will not have to wait for a long time for authentication and the authentication processes with respect to a plurality of authentication objects can be simultaneously effected at high speed.

Further, in this invention, since issuance of an obfuscation key, obfuscation of information and decoding (decipher) of obfuscated information can be effected by use of one random signal generator, the circuit can be simplified and the cost is lowered by combining the functions.

Further, in this invention, the authentication process can be effected between boards in the personal computer.

According to one aspect of this invention, there is provided an information reproducing apparatus for reproducing information recorded on an information. recording medium, which comprises authentication means for authenticating a specified authentication, object other than the information reproducing apparatus, and output means for outputting data reproduced from the information recording medium to the specified object authenticated by the authentication means.

According to still another aspect of this invention, there is provided an information reproducing apparatus for reproducing information recorded on an information recording medium, which comprises communication means for transferring information to a specified authentication object other than the information reproducing apparatus; authentication means for authenticating the authentication object by use of the communication means; and output means incorporating the communication means, for outputting data reproduced from the information recording medium to the object authenticated by the authentication means.

According to another aspect of this invention, there is provided an authenticating method comprising the steps of individually receiving first obfuscation keys from a plurality of authentication objects; individually issuing second obfuscation keys to a plurality of authentication objects; and forming a common obfuscation key with each of the authentication object by use of the first obfuscation key received from the authentication object and the second obfuscation key issued to the authentication object; wherein the histories of the processes of the above steps with respect to a plurality of authentication objects are separately and sequentially stored and a plurality of authentication processes are effected in parallel based on the stored histories of the processes.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention and together with the general description given above and the detailed description of the preferred embodiment given below, serve to explain the principles of the invention.

FIGS. 6A and 6B are a diagram showing the contents of history information recorded in the authentication information storing section;

DETAILED DESCRIPTION OF THE INVENTION

There will now be described an information recording/reproducing apparatus according to an embodiment of this invention with reference to the accompanying drawings.

Figure 1:
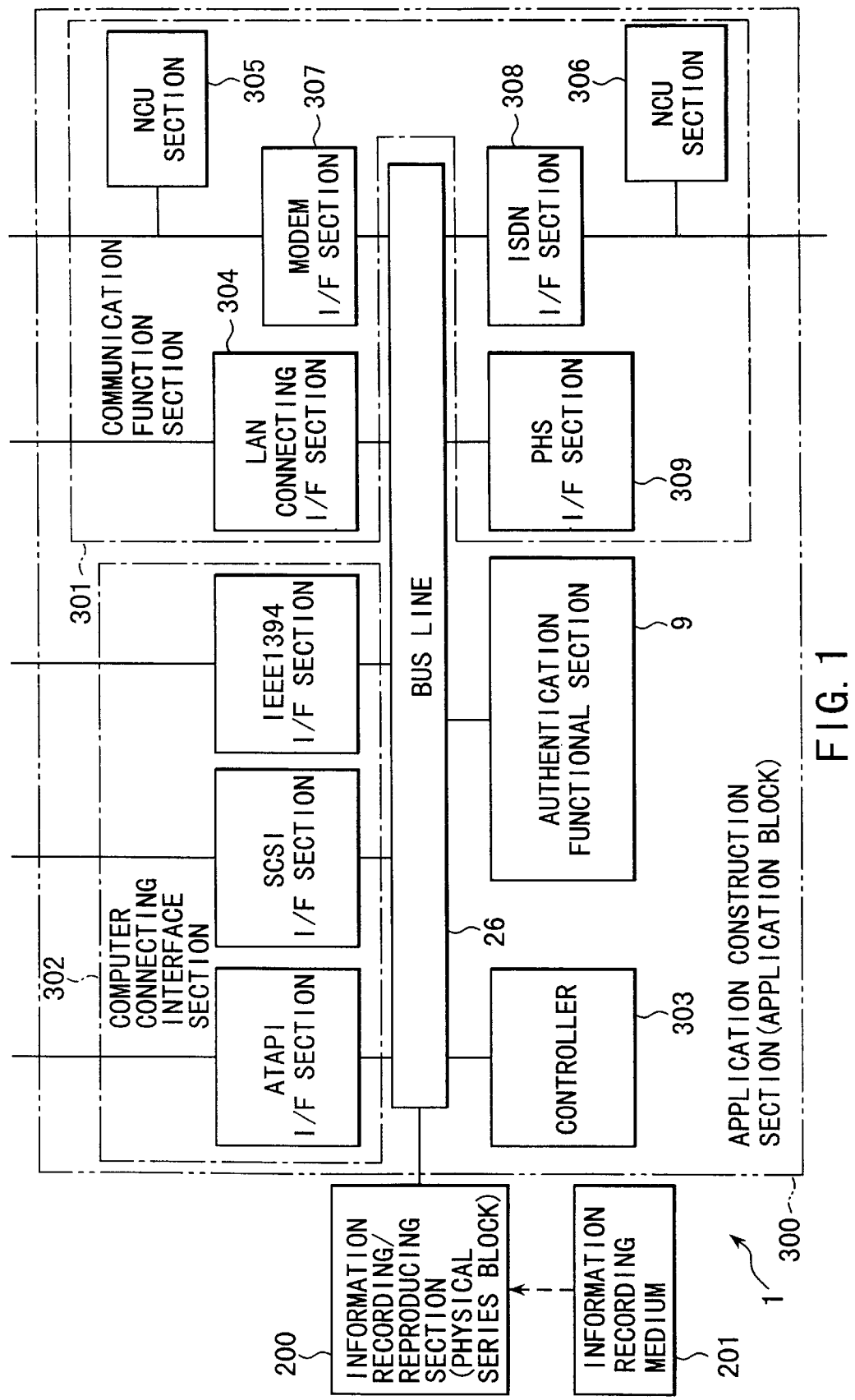
FIG. 1 is a block diagram for illustrating the construction of an information recording/reproducing apparatus having an authentication function according to an embodiment of this invention.

FIG. 1 shows the construction of an information recording/reproducing apparatus having an authentication function.

The information recording/reproducing apparatus 1 includes an information recording/reproducing section (physical series block) 200 for reproducing information from an information recording medium (optical disk) 201 or recording information thereon, an authentication functional section 9, a communication functional section 301, a computer connecting interface section 302, a controller 303 for controlling the whole portion of the information recording/reproducing apparatus 1, and a bus line 26 for connecting the above sections.

The information recording/reproducing apparatus 1 has the communication functional section 301 so as to independently transfer information via a network. Particularly, since it is used as a recording apparatus of a network server, it has various types of communication functions. Generally, it transmits information to clients via a LAN connecting I/F section 304. It is also possible to use a telephone line without using the above network and transmit information to a client or portable terminal which is not directly connected to LAN. When transferring information via the telephone line, it uses NCU sections 305 and 306 for specifying telephone numbers. It transmits information to a client or portable terminal which desires to transmit information by use of an analog signal via a modem I/F section 307. It transmits information from an ISDN I/F section 308 to a client or portable terminal which desires, to go transmit information by use of a digital signal. Further, it utilizes a PHS I/F section 309 for information communication with an information portable terminal containing a PHS function.

The internal construction and function of the authentication functional section 9 in the information recording/reproducing apparatus 1 are explained with reference to FIGS. 2 to 5 and 6A, 6B.

[1] Explanation of the outline of the authentication function (what is the authentication function?)

[1-1] The relation between the information recording/reproducing apparatus 1 and an external connection object.

Figure 2:
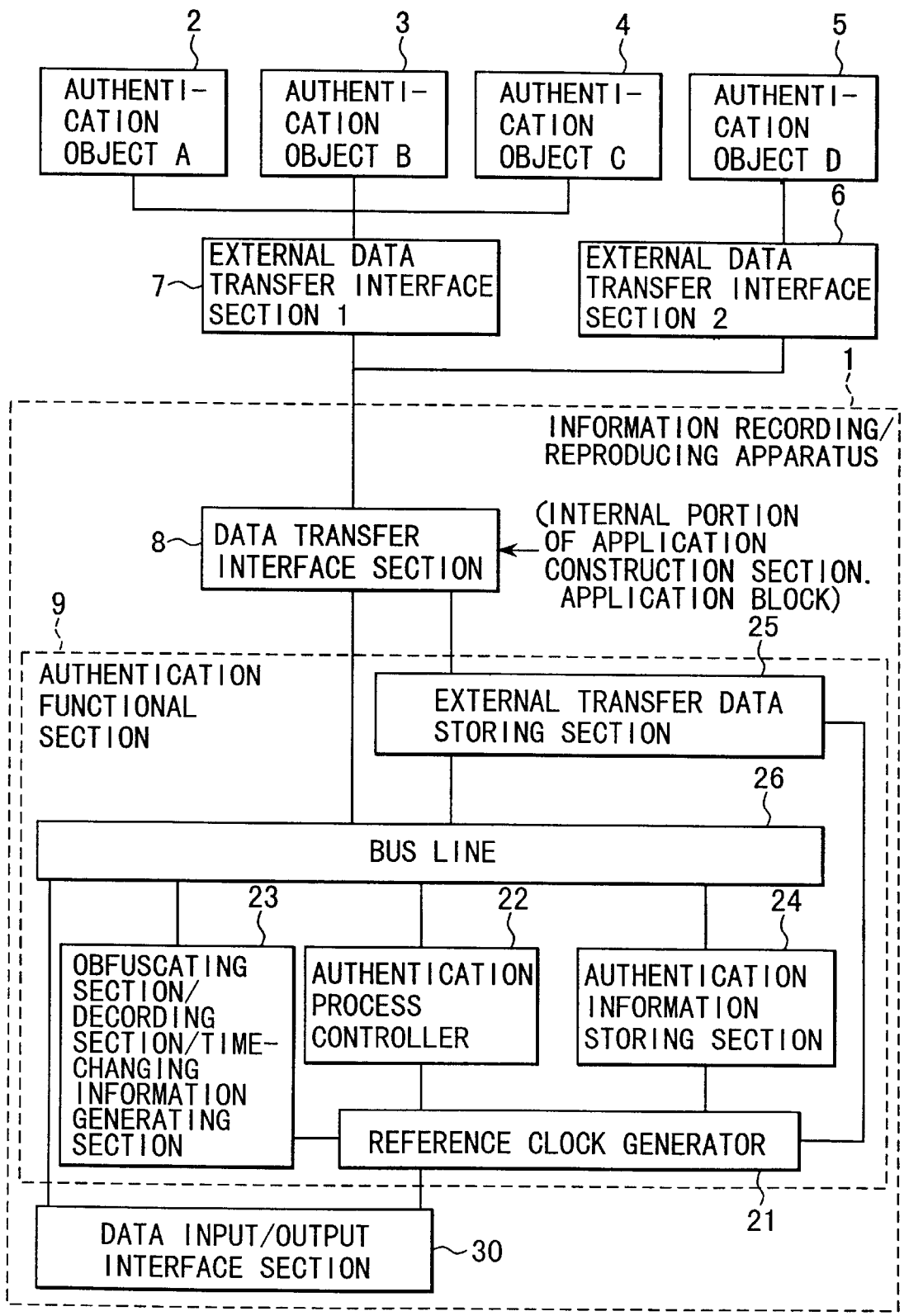
FIG. 2 is a diagram showing the relation between the internal construction of an authentication functional section and a peripheral device connected thereto.

FIG. 2 shows the relation between the internal construction of the authentication functional section 9 and a peripheral device connected thereto.

Information reproduced from or recorded on the information recording medium 201 is transferred with respect to the external connection object via a data transfer interface section 8 in the information recording/reproducing apparatus 1.

As the external connection object which is an object of information transfer, a plurality of objects are provided and, for example, an authentication object A:2, authentication object B:3, authentication object C:4, authentication object D:5 are connected as shown in FIG. 2.

When information transfer with respect to the external connection object is effected, for example, it is connected to the authentication object D:5 via the external data transfer interface section 2:6 or the external data transfer interface section 1:7 distributes information to the authentication objects A:2, B:3, C:4.

[1-2] Method for information transfer with respect to a plurality of external connection objects The information recording/reproducing apparatus 1 is connected to a plurality of connection objects as shown in FIG. 2 and the operations described directly below are effected in order to effect the following three operations:

◎ Information is obfuscated and transferred with respect to the external connection object; and ◎ an obfuscation key is commonly provided for each external connection object prior to transfer of obfuscated information.

That is, the three operations are as follows:

1) Information is transferred only with respect to a specified external connection object according to the content of information recorded on or reproduced from the information recording medium 201.

2) Information is independently and simultaneously transferred with respect to a plurality of external connection objects according to information items having different contents.

3) Information which is transferred with respect to a specified external connection object is made so as not to be monitored by other external connection objects.

[1-3] Previous authentication operation with a plurality of external connection objects A previous authentication operation is effected before obfuscated information is transferred with respect to the external connection object. The authentication operation is effected by a series of processes as follows.

1) An adequate external connection object (authentication object) is searched for according to the content of information recorded on or reproduced from the information recording medium 201.

2) An ID number is issued for each detected authentication object (external connection object).

3) Whether the detected authentication object (external connection object) is a real authentication object or not is determined by use of a method (which will be described later) called "challenge response".

4) A secret obfuscation decipher key which can be shared only with a specified authentication object is formed.

[1-4] Concrete example of information transfer in the network system

The explanation according to the concrete embodiment for explanation of the outline is made below.

When the connection shown in FIG. 2 is applied to the network system, the information recording/reproducing apparatus 1 is used as a main memory drive of a network server. The information recording/reproducing apparatus 1 independently distributes and collects information according to the distributed processing of the network server.

After a client (IP address or telephone number thereof) to or by whom information is distributed or collected and the content of the information to be distributed or collected are informed from the network server, the information recording/reproducing apparatus 1 starts direct communication with the client without using the main CPU of the network server.

Therefore, when this invention is applied to the network system, the authentication object A:2, authentication object B:3, authentication object C:4, authentication object D:5 indicate individual client machines (such as PC). Further, the data transfer interface section 8 corresponds to a "LAN I/F section", "modem" or "digital communication I/F section such as PHS", and the external data transfer interface section 1:7 corresponds to a "fire wall", "router", "gateway", or "bridge". It is also possible to understand that the external data transfer interface section 2:6 connected to one client machine (authentication object D:5) corresponds to a "modem", "digital communication I/F section such as PHS" or "LAN I/F section" contained in the client machine.

The data transfer interface section 8 corresponds to the LAN connection I/F section 304, modem I/F section 307, ISDN I/F section 308 and PHS I/F section 309 in the communication functional section 301 shown in FIG. 1.

[1-5] Concrete example of information transfer in the PC system

There are two types as follows as an external connection object (authentication object) in the PC (personal computer) system.

[1-5-1] Recording apparatus in PC

As an external connection object (authentication object), a recording apparatus such as an "HDD", "CD-ROM", "MO", "PD (phase change recording drive)", DVD-ROM", "DVD-RAM", or "semiconductor memory" which is connected via an ATAPI (AT attachment packet interface), SCSI (small computer system interface) or IEEE1394 (serial interface proposed by U.S. Electric and Electronic Engineering Institute) is indicated. Further, the data transfer interface section 8, external data transfer interface section 7, and external data transfer interface section 6 indicate interface sections such as ATAPI, SCSI, IEEE1394.

[1-5-2] Signal processing section in PC

As an external connection object (authentication object), a signal processing section such as an "MPEG encoding/decoding section", "sound blaster section", "audio signal compression/expansion sections", "sub-picture run-length board", or "program execution CPU" is indicated. Further, the data transfer interface section 8, external data transfer interface section 7, and external data transfer interface section 6 indicate interface sections such as ATAPI, SCSI, IEEE1394.

The information recording/reproducing apparatus 1 is constructed by the information recording/reproducing section (physical block) 200 (refer to FIG. 9) which will be described later and which has the data transfer interface section 8, authentication functional section 9 and data input/output interface section 30 shown in FIG. 2, for example.

The above authentication object has the same construction as that of the authentication functional section 9. When the authentication object is single, information of one column of an authentication information recording section 24 as will be described later is stored.

[2] The relation between the recording content in an information recording medium 201 and the setting of an authentication object

[2-1] Format structure of DVD-video

DVD-video information can be roughly divided into a VGM (video manager) and VTS (video title set).

The VGM (video manager) includes control information for reproducing a menu or title and the VTS (video title set) is a set of titles having the same construction of various elements constructing video data.

A set of reproduction video data items in the VTS (video title set) is called a VOBS (video object set). The VOBS is a set of VOBs (video objects) having the PS (program stream) structure of MPEG2.

Each VOB can be divided into cells in the unit of scene according to the purpose of the manufacturer.

Further, each cell is constructed by a plurality of VOBUs (vide object units).

[2-2] Recording content in the information recording medium 201 in the DVD-video In the internal portion of the VOBU, "video information", "audio information", "sub-picture information" and "navigation information" are recorded together and each information is time-shared in the unit of block called a "pack" and recorded on the information recording medium 201.

Figure 3:
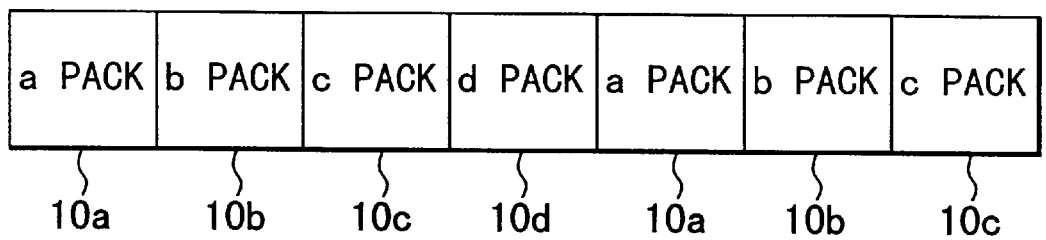
FIG. 3 is a diagram for illustrating the internal construction of a VOBU (video object unit) recorded on the information recording medium.

FIG. 3 shows the VOBU internal construction recorded on the information recording medium 201. Tracks are continuously formed in a spiral form from the inner periphery towards the outer periphery on the disk-like information recording medium 201 and FIG. 3 shows part of information recorded along the track.

For example, "a pack 10a" of FIG. 3 corresponds to a "video pack" in which video information is recorded, and "b pack 10b" corresponds to an "audio pack" in which audio information is recorded. In the audio pack, audio information is recorded in the form of AC-3 or PCM. Further, as one example, "c pack 10c" corresponds to a "sub-picture pack" having information such as a caption or inserted still picture, and "d pack 10d" corresponds to a "navigation pack" for indicating the next access destination.

The stream formed of a set of packs includes a video data stream, audio data stream, sub-picture data steam, navigation data stream, Dolby/linear audio data stream and the like.

[2-3] The relation between the recording content in DVD-video and the setting of an authentication object When the information recording/reproducing apparatus 1 shown in FIG. 2 is connected to a PC (personal computer), each authentication object corresponds to one of various types of signal processing boards built in the PC as explained in "[1-5-2] Signal processing section in PC".

For example, the authentication object A:2 indicates an MPEG encoder/decoder board, and the authentication object B:3 corresponds to an AC-3 or PCM decoder boarder, sound blaster board or an MPEG audio encoder/decoder board. Further, for example, the authentication object C:4 corresponds to a sub-picture run-length board or character generator board, and the authentication object D:5 can be made to correspond to the main CPU of PC which is connected via the I/O data line of a main CPU (not shown) and a PCI bus from the SCSI line or the like.

In the authentication functional section 9 contained in the information recording/reproducing apparatus 1, information of only "a pack 10a" among the recording information on the information recording medium 201 shown in FIG. 3 is extracted and transmitted to the authentication object A:2. Likewise, in the authentication functional section 9, information of "b pack 10b" is extracted and transmitted to the authentication object B:3, and information of "c pack 10c" is extracted and transmitted to the authentication object C:4.

Further, for example, the main CPU of PC which is the authentication object D:5 receives information of "d pack 10d" which is information of the navigation pack and the main CPU determines the position which is next accessed according to the received information.

[2-4] Identification method of information content in DVD-video

Figure 4:
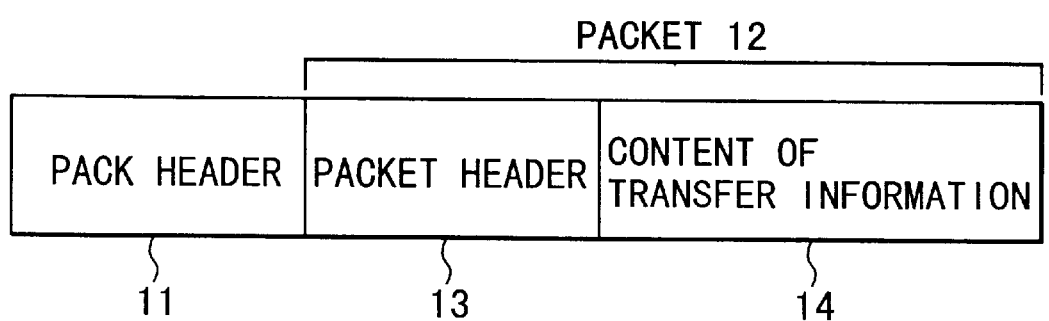
FIG. 4 is a diagram for illustrating the internal construction of a pack.

The internal portion of each pack shown in FIG. 3 is divided into a pack header 11 and packet 12 as shown in FIG. 4.

The pack header 11 includes a 4-byte pack start code, 6-byte system clock reference, 3-byte transfer rate display code and the like.

The packet 12 is further divided into a packet header 13 and an information content 14 to be transmitted. In the packet header 13, a 3-byte packet start code and a 1-byte stream ID are contained.

The type (stream) of information to be transferred is described in the stream ID of the packet header 13. More specifically, the content is described as follows:

○ When the stream ID is "11100000", the information content 14 to be transferred indicates video information (video stream) and the pack containing the packet 12 constructs a video pack.

○ When the stream ID is "110X0*" (* indicates a decoding audio stream number), the information content 14 to be transferred indicates audio information (audio stream) based on MPEG audio and the pack containing the packet 12 constructs audio.

○ When the stream ID is "10111101", the information content 14 to be transferred indicates the private stream 1 and "audio information other than MPEG audio" or "sub-picture information" is contained therein.

○ When the stream ID is "10111111", the information content 14 to be transferred indicates navigation information (private stream 2) and the pack containing the packet 12 constructs a navigation pack.

Particularly, when the stream ID is the private stream 1 of "10111101", a sub-stream ID (1 byte) indicating the type of detail information is recorded in the first position of the "content 14 of transfer information" of FIG. 4. More specifically, the content is as follows.

○ When the sub-stream ID is "001***" (*** indicates a decoding sub-picture number), the content 14 of transfer information indicates the sub-picture information (sub-picture stream) and the pack containing the packet 12 constructs a sub-stream pack.

○ When the sub-stream ID is "10000*" (* indicates a decoding audio stream number), the content 14 of transfer information indicates Dolby AC-3 and the pack containing the packet 12 constructs an audio pack.

○ When the sub-stream ID is "10100*" (* indicates a decoding audio stream number), the content 14 of transfer information indicates linear PCM and the pack containing the packet 12 constructs an audio pack.

Thus, the stream ID and sub-stream ID recorded in the packet 12 of FIG. 4 are read out for information reproduced from the information recording medium 201 by use of the authentication functional section 9 of g FIG. 2 and the type of information of each of the packs 10a to 10d is identified.

[2-5] The relation between the recording content of program software and the setting of an authentication object Only contents information such as video information and audio information is recorded in DVD-video, but on a computer system, text information and software programs for execution of applications are also present. The information recording/reproducing apparatus 1 is required to receive images displayed on the CRT of PC according to the distributed processing of PC and, at the same time, receive the software program and audio/video information from a recording device such as an HDD and CD-ROM.

Particularly, when audio information and video information are transferred, it is necessary to provide a good device so as not to interrupt the information in the course of transmission. Therefore, when video. information, audio information, software program and text information are simultaneously transferred, it is necessary to finely divide the video information into blocks and intermittently insert other information therebetween. Therefore, in order to cause the information recording/reproducing apparatus 1 to receive various information items from the exterior and record the received information on the information recording medium 201, information input to the data transfer interface section 8 is divided into blocks having a pack structure or packet structure for each type of information as shown in FIG. 3 and time-divided.

In the case of the PC system, received information is recorded in a file form on the information recording medium 201. An extension is added to each file name and the type of information can be identified by extensions (which can be used instead of the stream ID) such as ".TXT", ".WAV", ".BMP", ".JPEG", ".MPEG".

[2-6] The relation between the recording content in the network system and the setting of an authentication object In the case of the network system, for a telephone number used when a modem or IP address of a client machine which is the transmission/reception destination for each transfer information, an instruction is supplied from the main CPU of the server main body. In addition to a case wherein a plurality of information items are time-divided and transferred as shown in FIG. 3, it is possible to collectively transfer the same information at one time.

[3] Information transfer method and simple explanation of the internal construction of the authentication functional section 9

[3-1] Constituents of the authentication functional section 9

The schematic construction of the internal portion of the authentication functional section 9 is shown in FIG. 2.

The authentication functional section 9 includes a "reference clock generator 21", "authentication process controller 22", "obfuscating section/decoding section/time-changing information generating section 23", "authentication information recording section 24", "external transfer data storing section 25", and a common "bus line 26" for transmitting information between the respective sections.

[3-2] Authentication process controller 22

In the authentication process controller 22, the authentication-related processes (five processes) shown as follows are all effected.

◎ A process for reading out the stream ID and sub-stream ID in the packet 12 and inferring corresponding authentication objects 2 to 5.

◎ A process for issuing ID numbers for the respective authentication objects 2 to 5.

◎ A process for previously effecting the authentication operation with the authentication objects 2 to 5 and forming common obfuscation keys (bus keys) inherent to the respective authentication objects 2 to 5.

◎ A process for obfuscating information by use of the thus formed obfuscation key.

◎ A process for decoding obfuscated information by use of the formed obfuscation key.

[3-3] Authenticated information storing section 24

The authenticated information storing section 24 is constructed by a semiconductor memory (for example, EEPROM) and three types of information items necessary for the authentication-related processes are stored therein.

◎ Information necessary for formation of an obfuscation key.

◎ Obfuscation key information formed for each authentication object.

◎ A series of authentication procedure history information items processed for each authentication object as will be described later.

[3-4] Obfuscating section/decoding section/time-changing information generating section 23 In the obfuscating section/decoding section/time-changing information generating section 23, "◎ the process of forming the obfuscation key", "◎ the obfuscation process" and "◎ the decoding process" necessary for the authentication-related processes are effected.

[3-5] External transmission data storing section 25

Transmission/reception of obfuscated information is effected with respect to the authentication objects 2 to 5. Obfuscated information used at the time of transmission/reception is stored in the external transfer data storing section 25.

Information reproduced from the information recording medium 201 and output from the data input/output interface section 30 in the information recording/reproducing apparatus 1 is input to the obfuscating section/decoding section/time-changing information generating section 23 via the bus line 26, obfuscated therein, and then stored in the external transfer data storing section 25 via the bus line 26. When the obfuscated information is transmitted to the exterior, the data transfer interface section 8. directly reads out data from the external transfer-data storing section 25 (at the time of reproduction of data from the information recording medium 201).

Obfuscated information received from the authentication objects 2 to 5 is also temporarily stored in the external transfer data storing section 25 directly from the data transfer interface section 8. When the information is recorded on the information recording medium 201, obfuscated information is input from the external transfer data storing section 25 to the obfuscating section/decoding section/time-changing information generating section 23 via the bus line 26. After the obfuscated information is decoded in the obfuscating section/decoding section/time-changing information generating section 23, the information is supplied to the data input/output interface section 30 in the information recording/reproducing section (physical series block) 200 via the bus line 26 (at the time of recording of data on the information recording medium 201).

[3-6] Reference clock generating section 21

The authentication-related process is effected by use of an inherent clock in the authentication functional section 9. The inherent clock is created in the reference clock generating section 21.

The reference clock generated from the reference clock generating section 21 is supplied to the data input/output interface section 30, external transfer data storing section 25 and obfuscating section/decoding section/time-changing information generating section 23. Reproduction information subjected to the ECC error correction process is fetched from the information recording/reproducing section 200 which will be described later according to the reference clock by use of the data input/output interface section 30. Further, the obfuscating process is effected according to the reference clock by the obfuscating section/decoding section/time-changing information generating section 23 and information obfuscated at a timing defined by the reference clock is stored in the external transfer data storing section 25.

The timing at which information is processed in the data transfer interface section 8 is different from the timing of the reference clock created in the reference clock generating section 21 and corresponds to the timing of the communication protocol transferred with respect to the external data transfer interface sections 1/2:7/6. Further, the data transfer interface section 8 fetches obfuscation information stored in the external transfer data storing section 25 according to the timing of the communication protocol and transmits the information to the exterior.

The external transfer data storing section 25 acts as a buffer to keep the intermittent data of audio-data and the like.

[3-7] Conversion of communication protocol and acquirement of timing

As described in "[2-5] The relation between the recording content of program software and the setting of an authentication object", when mixed information containing audio information and video information is simultaneously transferred, it is necessary to transfer the audio information and video information of a certain amount or more in a preset period on a time-division basis so as not to interrupt the audio information and video information in the course of transmission. The data structure is rearranged when protocol conversion is made in the data transfer interface section 8.

As described in "[2-1] Format structure of DVD-video", information is stored on the information recording medium 201 according to the PS (program stream) structure of MPEG2 in the DVD-video. However, in application methods as described in "[1-4] Concrete example of information transfer in the network system" and "[1-5-1] Recording apparatus in PC", it is preferable to set the format structure of information transmitted/received with respect to the external data transfer interface sections 1/2:7/6 to TS (transport stream). TS uses a relatively short packet unit with a fixed length of 188 bytes and is different from PS in the packet size and packet structure (Newest MPEG Text Book (ASCII Publishing House, 1994) P.248 by Hiroshi Fujiwara).

Further, the transfer rate of information which can be transmitted/received is largely influenced according to the communication state of the communication line between the external data transfer interface sections 1/2:7/6 and the data transfer interface section 8.

Thus, it is difficult to record or reproduce information transmitted/received with respect to the exterior on or from the information recording medium 201 on the real time basis.

The "adaptability at the time of conversion of protocol" and "flexibility for the busy state of the external communication line" can be enhanced by temporarily storing obfuscation information transmitted/received with respect to the exterior into the external transfer data storing section 25 as shown in FIG. 2 and independently generating obfuscation information according to the inherent clock contained therein.

[4] ATAPI/SCSI command

[4-1] Standard I/F of the storage device ATAPI and SCSI are present as a standard interface for the storage device in the computer system such as an HDD, CD-ROM, DVD-ROM, MO, PD, MT.

Input/output and control of information are effected according to a command determined by ATAPI or SCSI between the storage device and the main CPU of PC.

As a standard command related to the authentication operation and executed on the ATAPI and SCSI, a "report key command" and "second key command" are present.

[4-2] Command configuration

Both of the report key command and second key command have the following two features as a common command configuration.

◎ It is constructed by a "command sentence" and a "data format" following the command sentence.

◎ An "operation code", "AGID (authentication grant ID)" and "key format" are contained in the command sentence (the explanation for AGID is made later).

[4-3] Report key command

The report key command is a command used when information is transmitted to the authentication objects 2 to 5 and the operation code is "A4" in the hexadecimal notation.

○ "AGID", "stream ID" and "set area information" are transmitted with the key format set at "000000", ○ a "challenge key" is transmitted with the key format set at "000001", and ○ an "obfuscation key 1" is transmitted with the key format set at "000010".

(the obfuscation keys (various keys) are explained in "[5] Obfuscation key")

[4-4] Second key command

The second key command is a command used when information is received from the authentication objects 2 to 5 and the operation code is "A3" in the hexadecimal notation.

○ A "challenge key" is transmitted with the key format set at "000001", and

○ an "obfuscation key 2" is transmitted with the key format set at "000011".

(the obfuscation keys (various keys) are explained in "[5] Obfuscation key")

[5] Obfuscation key

[5-1] Types of obfuscation keys

Figure 5:
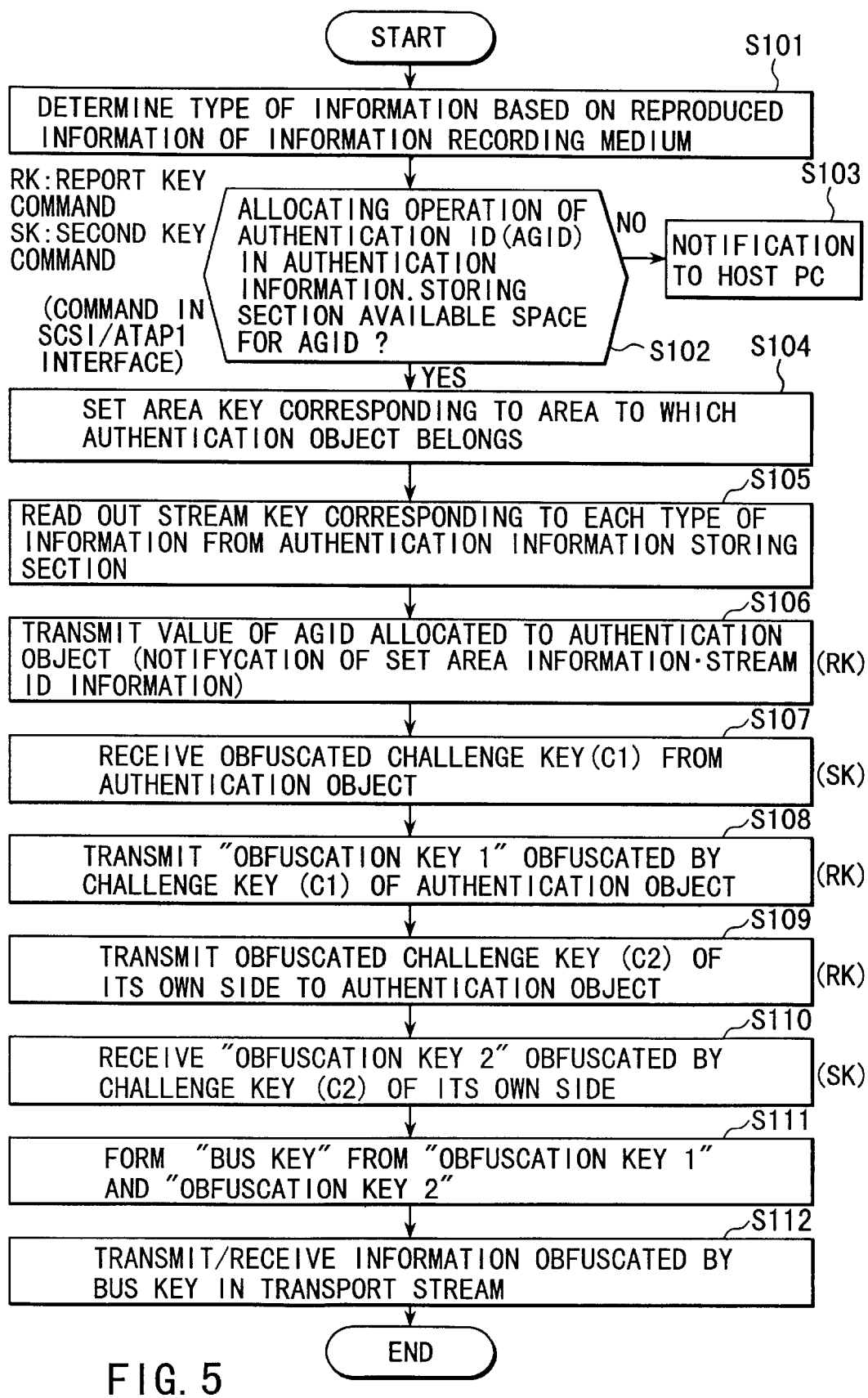
FIG. 5 is a flowchart for illustrating the procedure of the authentication process.

As shown in FIG. 5, six types of keys of "stream key", "area key", "challenge key", obfuscation key 1", "obfuscation key 2" and "bus key" are used in a series of authentication operations.

[5-2] Bus key (which is a common key used for obfuscating and transmitting information)

As explained in "[1-2] Method for information transfer with respect to a plurality of external connection objects", "transfer of obfuscation information" and "common usage of the key for obfuscation" are effected for the authentication objects 2 to 5. An obfuscation key used for obfuscating/decoding information recorded on or reproduced from the information recording medium 201 is shown. It is used in the obfuscating section/decoding section/time-changing information generating section 23.

The obfuscation technique is an object of the restriction on exports of U.S.A. At present, in the RSA technique (which is one of the obfuscation systems and uses an asymmetric public key), the obfuscation technique with the obfuscation strength of approx. 56 bits can be exported, but it is difficult to export the obfuscation technique with the length more than the above value. The upper limit of the obfuscation strength of DES (which is one of the obfuscation systems and uses a symmetric common key) is set to 56 bits in the U.S.A. export restriction for Japan. Likewise, the upper limit of the obfuscation strength of RC4 and RC2 (which is one of the obfuscation systems and uses a symmetric common key) is set to 56 bits (Intra & internet security (Ohm Co. 1996) P.1: by Takahiro Sugimoto).

When taking the restriction on exports of U.S.A. into consideration, it is necessary to consider that the bus key size is set to 56 bits as a standard. However, if the obfuscation key size becomes small, it becomes extremely difficult to acquire the high-level security (prevention of decipher of the obfuscation key by a hacker). It is desirable to set the bus key size to at least 28 bits which is half of 56 bits with the above condition taken into consideration and it is necessary to set the bus key size to at least 14 bits which is ¼ of 56 bits from the viewpoint of security.

[5-3] Obfuscation key ½ (key for forming the bus key)

In order to form the bus key, key information items which are used as a source of formation of the bus key are previously exchanged. Key information transmitted to the authentication objects 2 to 5 is called an "obfuscation key 1" and key information received from the authentication objects 2 to 5 is called an "obfuscation key 2". A bus key is formed by combining the obfuscation keys 1 and 2 according to the same rule in the authentication functional section 9 with the authentication objects 2 to 5.

For the same reason as described above, it is desirable to set the size of the obfuscation key ½ to 28 bits or more and the size of at least 14 bits is necessary.

[5-4] Challenge key (key for obfuscating the obfuscation key ½)

If the obfuscation keys 1 and 2 are transmitted or received as they are, they are monitored via the communication line and the obfuscation technique is easily deciphered. In order to prevent this, the obfuscation keys 1 and 2 are obfuscated and then transmitted. The obfuscation key for obfuscating the obfuscation key ½ is called a challenge key.

Before transmitting/receiving the obfuscation key ½, challenge keys are exchanged by use of the communication line.

[5-5] Stream key (which is a key for obfuscating the challenge key)

Since the challenge key itself is transferred via the communication line even if the challenge key is used for acquirement of high-level security, the third party can easily decipher the obfuscation if the third party monitors the whole information in the communication line. Further, in order to enhance the degree of security, a "stream key" and "area key" are used.

The stream key is an obfuscation key determined for each type of information. For example, if the authentication object A2 is an MPEG encode/decode board and the authentication object B3 is an audio encode/decode board, then a common obfuscation key is previously set for the MPEG encode/decode board corresponding to the video stream. The obfuscation key information is known to the authentication object A2 but is not known to the authentication object B3. Therefore, even if information obfuscated by use of the key is monitored by the authentication object B3, the obfuscation cannot be deciphered.

The stream key is previously stored in the authentication information storing section 24 of FIG. 2.

The stream key is commonly used by the authentication objects 2 to 5 according to the information contents and information is previously stored as stream key information items 31 to 34 corresponding to information items a to d of FIG. 6A.

[5-6] Area key (which is a key used for obfuscating the challenge key)

For example, the MPEG encode/decode board is provided not only in the PC (personal computer) directly connected to the information recording/reproducing apparatus 1, but also in the other PC (client) connected via the network. Therefore, there occurs a possibility that information will be monitored by use of the MPEG encode/decode board in the other PC when only the stream key is used. In order to solve this problem, an area key is provided.

The area key includes specified common keys according to the respective areas shown as follows.

○ In a range of the PC system to which the information recording/reproducing apparatus 1 is directly connected ○ In a range of an individual system (for example, a system connected via one IEEE1394) containing an audio/video device such as a TV or stereo set ○ In a range of local area (for example, in one company, in one school, in one office, in one region protected by the fire wall) of a specified fire wall (protection system of LAN in the company)

○ World wide area

The area key is previously set and recorded in aid positions of the first to fourth area key information items 31 to 34 as shown in FIG. 6A.

The area key size and stream key size are half the size of the obfuscation key ½. A code constructed by connecting the area key and stream key as MSB and LSB is used as an obfuscation key of the challenge key.

Therefore, it is desirable to set the area key size and stream key size to 14 bits or more and it becomes necessary to set them to at least 5 bits.

[6] Authentication process effected with respect to one authenticated object

[6-1] Comment on FIG. 5

The previous authentication operation procedure shown in "[1-3] Previous authentication operation with a plurality of external connection objects" is explained in detail with reference to FIG. 5.

The authentication operation effected with respect to the authentication objects 2 to 5 is effected by exchange of commands (report key command or second key command) on ATAPI or SCSI. A portion for transmission by the report key command among the steps in the flowchart of FIG. 5 is indicated by (RK) and a portion for reception by the second key command is indicated by (SK).

[6-2] Setting of the authentication object

A case wherein the DVD-video is used as the information recording medium 201 is taken as an example and the method for setting the authentication object is explained.

In the step S101 in which the type of information is determined based on reproduced information from the information recording medium 201, the type of information for each of the packs 10a to 10d is identified based on the stream ID or sub-stream ID recorded in the packet 12 of FIG. 4 as explained in "[2-4] Identification method of information content in DVD-video".

Next, the step S102 of allocating AGID according to the type of information is effected (the detail content thereof is explained in "[7-2] Simultaneous and parallel authentication method").

A transmission destination area is automatically set (S104) by the authentication process controller 22 according to the scale of the system connected to the information recording/reproducing apparatus 1, corresponding area key information items 35 to 38 are reproduced from the authentication information recording section 24, and the address thereof is informed to the authentication process controller 22. Further, the stream key is read out from the authentication information recording section 24 according to the identified type of information (S105) and the address thereof is informed to the authentication process controller 22.

[6-3] Searching of the authentication object and subject authentication

At the present time, one of the authentication object A2 to the authentication object D5 which is a corresponding authentication object is not known. As explained in "[4-3] Report key command", a "value of AGID", "stream ID information", "set area information" are simultaneously transmitted to all of the authentication objects 2 to 5 by use of the report key command (S106).

The corresponding authentication object A2 independently derives the "stream key" and "area key" from the "stream ID" and "set area information", combines the two keys to form a combination key and transmits a challenge key (C1) obfuscated by use of the combination key.

If the authentication functional section 9 receives the challenge key (C1) (S107), it comes to know that a candidate of the corresponding authenticated object A2 is present. In parallel with this operation, the authentication functional section 9 independently derives the "stream key" and "area key" to form a combination key and deciphers (decodes) the obfuscated challenge key (C1) by use of the combination key. If the challenge key is precisely deciphered (decoded), it is known that the to-be-transmitted destination is a real authentication object A2.

[6-4] Challenge response

A step of transmitting obfuscated information and decoding the same on the reception side is effected for transmission/reception of the "obfuscation key 1" and "obfuscation key 2" as explained in "[5] Obfuscation key".

In the obfuscation technique, the following method is known as a bidirectional subject authentication method and the method is called a "challenge response".

○ Specified information is transmitted from A to B.

○ B returns information obfuscated by use of the received information to A.

○ A confirms that B is the subject based on the information returned from B.

○ B transmits specified information to A.

○ A returns information obfuscated by use of the received information to B.

○ B confirms that A is the subject based on the information returned from A.

Also, in the authentication functional section 9, the "challenge response" is effected. The "obfuscation key 1" is formed in the obfuscating section/decoding section/time-changing information generating section 23, obfuscated by use of a challenge key (C1) received from the authentication object A2 and then transmitted to the authentication object A2 (S108).

Next, a challenge key (C2) is formed by the obfuscating section/decoding section/time-changing information generating section 23, obfuscated by use of a combination key formed by combining the "stream key" and "area key" and then simultaneously transmitted to the authentication objects A2 to D5 (S109). Only the authentication object A2 who is the subject and knows the "steam key" and "area key" can decipher the challenge key (C2).

The authentication object A2 independently forms the "obfuscation key 2", obfuscates the obfuscation key 2 by use of the received challenge key (C2) and returns the obfuscated key. As a result, when the authentication functional section 9 receives the obfuscated obfuscation key 2 (S110), it decodes the received obfuscation key by use of the challenge key (C2).

[6-5] Formation of bus key and transfer of obfuscation information

A "bus key" is formed based on the "obfuscation key 1" and "obfuscation key 2" obtained by a series of above steps (S111). When the authentication operation is completed, information to be transferred is obfuscated by use of the bus key and transferred after protocol-converted into a transport stream as described in "[3-7] Conversion of communication protocol and acquirement of timing" (S112).

[7] Simultaneous and parallel authentication method for a plurality of authentication objects

[7-1] Necessity of the simultaneous process for a plurality of authentication objects As shown in FIG. 3, information recorded/reproduced on or from the information recording/reproducing medium 201 contains plural types of information items for each pack. Further, as shown in FIG. 2, a plurality of authentication objects 2 to 5 are present. Therefore, it is necessary to simultaneously effect the authentication operations and transfer information with respect to the plurality of authentication objects 2 to 5 in parallel.

[7-2] Simultaneous and parallel authentication method

As the simultaneous and parallel authentication method, the history is stored in the authentication information storing section 24 for each authentication step (FIG. 5) effected with respect to the individual authentication objects 2 to 5.

The history information content stored in the authentication information storing section 24 is shown in FIGS. 6A and 6B. In the authentication functional section 9, it is possible to simultaneously effect the authentication operation and transfer information with respect to the four authentication objects. An ID number (AGID) is allocated for each authentication operation for management. In FIG. 6A, the authentication history is recorded in the vertical direction (column direction) for each of the AGID numbers 40 to 43.

When the authentication operation and the process of transmitting information successively effected are completed, information of the column of a corresponding AGID is cleared and the AGID number is cleared.

If a new authentication operation occurs while the process for the specified AGID number is being effected, the authentication process controller 22 searches for an available AGID number in the authentication information storing section 24 and stores the authentication history into the column of the available AGID number. When no available AGID number is present, information indicating that the authentication is impossible is informed to the host PC (S103). The allocation step of the AGID number corresponds to the step S102 in FIG. 5.

The authentication histories for the AGID numbers 40 to 43 contain challenge key information items 45 to 48 issued from the other party, challenge key information items 51 to 54 issued from its own side, obfuscation key 1 information items 55 to 58 issued from its own side, obfuscation key 2 information items 60 to 63 issued from the other side, bus key. information items 65 to 68, AGID transmission completion information items 70 to 73, challenge key reception completion information items 75 to 78, obfuscation key 1 transmission completion information items 80 to 83, challenge key transmission completion information items 85 to 88 and obfuscation key 2 reception completion information items 90 to 93.

[8] Flow of signals at the time of authentication operation

[8-1] Internal construction of the authentication process controller

Figure 7:
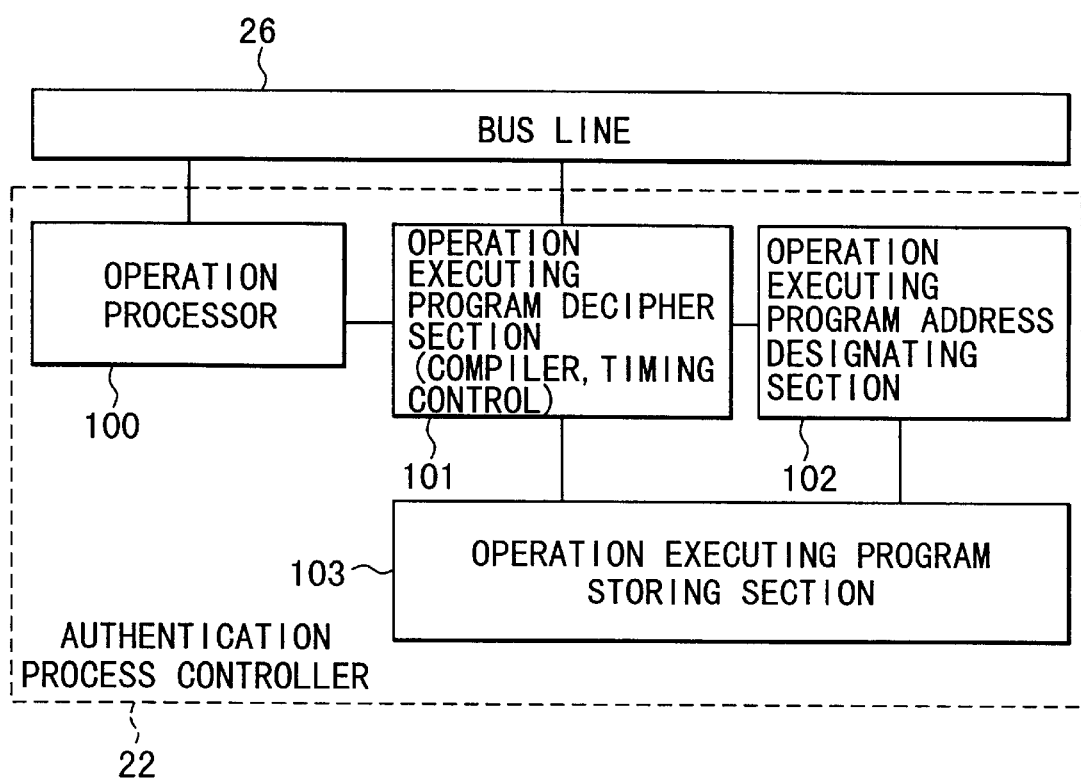
FIG. 7 is a block diagram showing the construction of an authentication process controlling section.

The authentication process controller 22 can be formed of a CPU and a semiconductor memory (RAM) for storing a program for controlling the CPU. However, in order to more precisely explain the function and flow of signals, function blocks constructing the authentication process controller 22 are shown in FIG. 7 and the authentication process controller includes an operation processor 100, operation executing program decipher section (compiler, timing control) 101, operation executing program address designating section 102, and operation executing program storing section 103.

[8-1-1] Function of the operation execution program storing section 103

An operation execution program for executing the flowchart shown in FIG. 5 is stored in the operation execution program storing section 103.

[8-1-2] Function of the operation processor 100

In the operation processor 100, the simultaneous and parallel authentication processes can be effected with respect to a plurality of authentication objects 2 to 5 by effecting the following four processes according to the operation execution program.

1) A transmission process of reproduction information from the data input/output interface section 30 and a transmission process of recording information to the data input/output interface section 30

2) Control for the "obfuscation process", "decoding process", "formation process for various obfuscation keys" and the like in the obfuscating section/decoding section/time-changing information generating section 23

3) A recording process of obfuscation information to the external transfer data storing section 25 and a reproduction process of obfuscation information from the external transfer data storing section 25

4) A process for temporarily holding various obfuscation keys for the authentication information storing section 24 and sequentially holding the authentication process history in each step

[8-1-3] Operation executing program decipher section 101

A program compile corresponding to the operation executing program stored in the operation executing program storing section 103 is executed in the decipher section 101 and the result thereof is transmitted to the operation processor 100. Further, in the operation executing program decipher section 101, the timing control according to the flowchart shown in FIG. 5 is effected.

[8-1-4] Operation executing program address designating section 102

When the simultaneous and parallel authentication processes are effected with respect to a plurality of authentication objects 2 to 5, the authentication step shown in FIG. 5 is different for each of the authentication objects 2 to 5. For example, at a specified timing, the "transmission process (S106) of AGID value allocated to the authentication object A:2" is completed for the authentication object A:2, the "reception process (S110) of the "obfuscation key 2" obfuscated by use of the challenge key (C2) on its own side" is effected for the authentication object B:3, and the "reception process (S107) of the obfuscated challenge key from the authentication object C:4" is effected for the authentication object C:4.

The process of the operation processor 100 effected immediately after this includes the following steps (a) to (c).

(a) First, the ""obfuscation key 1" obfuscated by use of the challenge key (C1) of the authentication object C:4 is transmitted (S108)" to the authentication object C:4.

(b) Next, a "bus key" is formed by use of the "obfuscation key 1" and "obfuscation key 2" for the authentication object B:3 (S111), the result thereof is storied into the authentication information storing section 24, then stream information in the b pack 10b (FIG. 3) corresponding to the authentication object B:3 is read out from the data input/output interface section 30, and the information is obfuscated by the obfuscating section/decoding section/time-changing information generating section 23 and sequentially stored into the external transfer data storing section 25.

(c) The step (b) is interrupted if the "obfuscated challenge key (C1) is received from the authentication object A:2 (S107)", a process of "transmitting the "obfuscation key 1" obfuscated by use of the challenge key (C1) of the authentication object A:2 (S108)" is effected, and then a process of "transmitting the obfuscated challenge key (C2) on its own side to the authentication object A:2 (S109)" is effected. After this, the step (b) is continued.

As is understood from the above example, it is necessary to effect the different processes. on the flowchart of FIG. 5 for a plurality of authentication objects 2 to 5 according to the authentication history stored in the authentication information storing section 24. In the above example, the address of the operation execution program storing section 103 in which the program is stored is different for the respective steps (a) to (c). In order to easily shift the steps from (a) to (b) and (b) to (c), the address of the program to be jumped is designated by the operation execution program address designating section 102.

[8-2] Feature of the obfuscating section/decoding section/time-changing information generating section 23

[8-2-1] Significant feature of the operation of the obfuscating section/decoding section/time-changing information generating section 23

Figure 8:
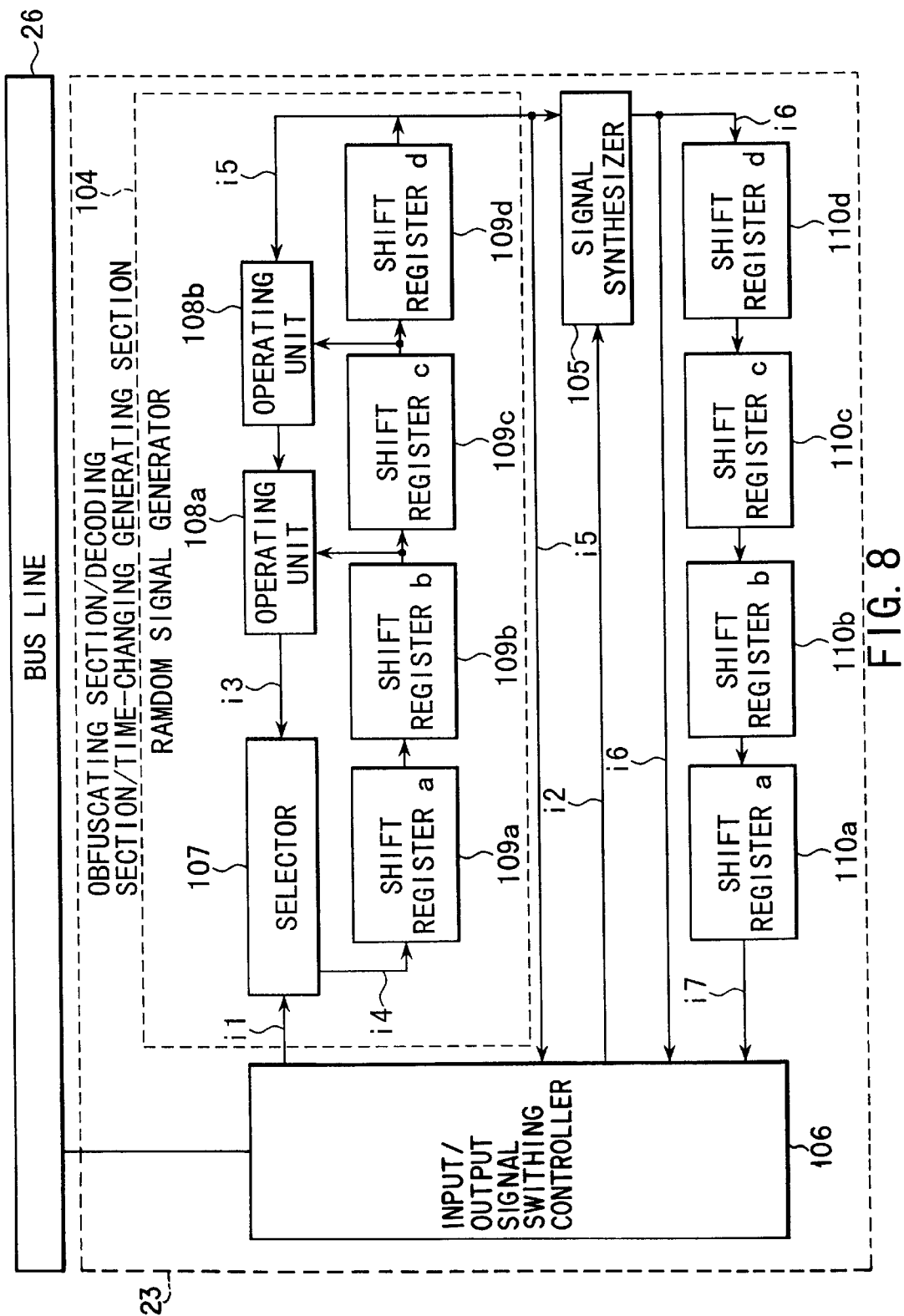
FIG. 8 is a block diagram showing the constructions of an obfuscating section (encoding section)/decoding section/time-changing information generating section.

As shown in FIG. 8, the obfuscating section/decoding section/time-changing information generating section 23 includes a random signal generator 104, signal synthesizer 105, input/output signal switching controller 106, and shift registers 110a to 110d.

The "information obfuscating process", "obfuscated information decoding (obfuscation decipher) process" and "generating process of time-changing information which becomes the base of various obfuscation keys" effected in the obfuscating section/decoding section/time-changing information generating section 23 are processes which are functionally similar to one another. Therefore, the first important feature lies in that one set of the random signal generator 104 and signal synthesizer 105 are commonly used for effecting the three processes. Conventionally, circuits are separately used for effecting the three processes, but in this invention, the circuits are commonly used as shown in FIG. 8, the circuit construction can significantly be simplified and, as a result, the cost can be lowered.

Further, the second feature is that the random signal generator 104 is simply treated as a series of shift registers 109a to 109d and combined with the signal synthesizer 105 to effect the following two processes.

⊚ A "combination key with respect to the individual authentication object" is formed by use of the "area key" and "stream key".

⊚ A "bus key" is formed by use of the "obfuscation key 1" and "obfuscation key 2".

As a result, the circuit construction can significantly be simplified and, as a result, the cost can be lowered.

[8-2-2] Random signal generator 104

As shown in FIG. 8, the random signal generator 104 includes shift registers 109a to 109d, operating units 108a, 108b, and selector 107.

The operating units 108a, 108b are constructed by adders which are exclusive-use OR circuits. When an output signal i3 of the operating unit 108a is supplied as an input signal i4 of the shift register 109a by the selector 107, the random signal generator 104 is constructed.

That is, the output signal of the shift register 109a is transmitted to the shift register 109d via the shift registers 109b, 109c. An output signal i5 of the shift register 109d is added to an output signal of the shift register 109c in the operating unit 108b, the result of addition is added to an output signal of the shift register 109b in the operating unit 108a, and the result of addition (output signal i3) is input to the shift register 109a again and thus a signal is circulated. As the result of circulation, the output signal i5 of the shift register 109d becomes a random signal. By optimizing the combination of the circuit elements of the random signal generator 104, an "M-series random signal generator" is obtained.

[8-2-3] Signal synthesizer 105

Generally, the signal synthesizer 105 is constructed by a complicated combination of gates according to the "bus key" forming system or the obfuscating/decoding system. However, the signal synthesizer 105 can attain the function of the obfuscating section/decoding section/time-changing information generating section 23 even if it is constructed only by an adder which is one exclusive-use OR circuit.

[8-3] Concrete signal flow at the time of authentication operation

The concrete signal flow in the respective steps of the flowchart shown in FIG. 5 is explained below.

1) Starting process of the random signal generator 104

When the power supply switch of the information recording/reproducing apparatus 1 is turned ON, "0" is successively supplied to the selector 107 for initialization under the control of the authentication process controller 22. When "0" successively supplied is circulated once in the shift registers 109a to 109d, the output signal i5 of the shift register 109d is returned to the input i4 of the shift register 109a again via the selector 107 and a random signal is generated as time-changing information in synchronism with the clock generated from the reference clock generator 21.

2) Allocation of AGID

The stream ID and sub-stream ID in the packet 12 shown in FIG. 4 are read from the pack string (FIG. 3) recorded on the information recording medium 201 and a necessary number of AGIDs is checked. In the authentication process controller 22, the "AGID transmission completion information items 70 to 73" in the authentication information storing section 24 are read out and the number of an available AGID (which is not yet used for the authentication process) is searched for. AGID is set into an available area for each type of information (stream content). After this, the explanation is made by use of a column of "AGID=0". Further, it is assumed that the authentication object A:2 is a subject to be authenticated.

3) Setting of the area key and stream key

The stream key and area key are set according to the procedure explained in "[5-5] Stream key", "[5-6] Area key" and "[6-2] Setting of the authentication object". The stream key is selected from the stream key information items 31 to 34 corresponding to the information items a to d in the authentication information recording medium 24 and the area key is selected from the first to fourth area key information items 35 to 38 in the authentication information recording medium 24.

After this, a case wherein the stream key information 32 corresponding to the information b and the first area key information 35 are used as an example is explained.

4) Transmission process of AGID

In the authentication process controller 22, the "stream ID" and "set area information" are notified together with the set AGID number to the data transfer interface section 8.

When the notification is completed, the authentication process controller 22 sets a "1" bit (flag) in a portion of the AGID transmission completion information 70 in the authentication information recording medium 24.

In the data transfer interface section 8, the notified "AGID number", "stream ID" and "set area information" are subjected to the format change according to the format of the report key command of ATAPI or SCSI and then transmitted to the authentication object A:2.

5) Reception of the obfuscated challenge key from the authentication object A:2

When having received AGID, the authentication object A:2 issues a challenge key, obfuscates the challenge key by use of a combination key formed from the stream key and area key and transmits the same according to the format of Send Key Command of ATAPI or SCSI.

In the data transfer interface section 8, the obfuscated challenge key formed by the authentication object A:2 is extracted from the format of the Second Key Command of ATAPI or SCSI and stored in the external transfer data storing section 25.

6) Temporary saving process of time-changing information

Information generated from the random signal generator 104 is temporarily saved in the authentication information storing section 24 before decoding (deciphering) the challenge key received from the authentication object A:2. That is, the input/output signal switching controller 106 directly fetches the output signal i5 of the shift register 109d in response to an instruction from the authentication process controller 22 and temporarily holds the same into the "timely time-changing information 39 (FIG. 6A) formed by the random signal generator 104" in the authentication information storing section 24 via the bus line 26.

7) Formation of the combination key and decoding process of the challenge key

In the operation processor 100, the stream key information 32 corresponding to the information b in the authentication information storing section 24 is transmitted to the obfuscating section/decoding section/time-changing information generating section 23 via the bus line 26 according to the program in the operation execution program storing section 103. In the obfuscating section/decoding section/time-changing information generating section 23, the input/output signal switching controller 106 controls the selector 107 to transmit the stream key information 32 corresponding to the information b to the shift register 109a as it is. Immediately after this, the first area key information 35 in the authentication information storing section 24 is transmitted to the shift register 109a. At this time, the information is supplied to the shift register 109a in the same manner as described before.

When the operation of transmitting the first area key information 35 to the shift register 109a is completed, the first bit of the stream key information 32 corresponding to the information b reaches the most significant bit position of the shift register 109d and information in the shift registers 109a to 109d is used as the combination key.

Then, the input/output signal switching controller 106 is operated such that the "obfuscated challenge key" stored in the external transfer data storing section 25 is input as the input signal i2 of the signal synthesizer 105 under the control of the authentication process controller 22. As a result, a decoded (deciphered) challenge key appears on the output signal i6 of the signal synthesizer 105. After this, the decoded (deciphered) challenge key is stored in the address of the "challenge key information 45 issued from the other party" in the authentication information storing section 24 via the shift registers 110a to 110d, input/output signal switching controller 106, and bus line 254.

In the above explanation, the decoding (deciphering) process of the obfuscated challenge key is started immediately after the process of transmission of the first area information 35 to the shift register 109a is completed, but this is not limitative, and it is possible to start the decoding process after the transmission to the shift register 109a was completed and a specified clock has passed.

Thus, when storage of the challenge key into the authentication information storing section 24 is completed after decoding, the bit (flag) of the challenge key reception completion information 75 is set to "1".

8) Re-start process of generation of time-changing information

When the obfuscation process of the AGID number is completed, the obfuscating section/decoding section/time-changing information generating section 23 re-starts generation of time-changing information. That is, timely time-changing information 39 (FIG. 6A) formed by the random signal generator 104 and temporarily stored in the authentication information storing section 24 is input to the shift register 109a as an input signal i4 via the bus line 26, input/output signal switching controller 106 and selector 107 according to the control of the authentication process controller 22. When the input is completed, the selector 107 is closed, the output signal i3 of the operating unit 108a is returned to the input signal i4 of the shift register 109a and a random signal which is time-changing information is successively generated again.

9) Formation of the obfuscation key 1

Since time-changing information is normally generated in the random signal generator 104, various types of obfuscation keys can be formed by extracting the time-changing information at a specified timing.

The output signal i5 of the random signal generator 104 is input to the input/output signal switching controller 106 as an "obfuscation key 1" in response to an instruction from the operation processor 100 according to the program of the operation execution program storing section 103 and stored in the "obfuscation key 1 information 55 issued from its own side" (FIG. 6A) in the authentication information storing section 24 via the bus line 26. When storage of the obfuscation key 1 is completed, "6) Temporary saving process of time-changing information" is effected.

10) Obfuscating method of obfuscation key 1

The challenge key from the address of the "challenge key information 45 issued from the other party" in the authentication information storing section 24 is input to the shift registers 109a to 109d as an input signal i4 via the bus line 26, input/output signal switching controller 106 and selector 107 according to the control of the authentication process controller 22. When the input of the challenge key is completed, the output signal i5 of the challenge key is input to the signal synthesizer 105.

After this, the selector 107 is closed, the output signal of the operating unit 108a is output to the shift register 109a and circulated in the random signal generator 104 by a specified clock, and then the obfuscation key 1 from the address of the "obfuscation key 1 information 55 issued from its own side" in the authentication information storing section 24 is input to the signal synthesizer 105 as an input signal i2 via the bus line 26 and input/output signal switching controller 106. The output signal i6 of the signal synthesizer 105 is used as the obfuscated obfuscation key 1 and stored into the external transfer data storing section 25 via the input/output signal switching controller 106 and bus line 26.

When formation of the obfuscated obfuscation key 1 is completed, the bit (flag) of the address of the "obfuscation key 1 transmission completion information 80", in the authentication information storing section 24 is set to "1" and then "8) Re-start process of generation of time-changing information" is effected.

11) Transmission process of obfuscation key 1

The data transfer interface section 8 reads out the obfuscated obfuscation key 1 from the external transfer data storing section 25, converts the format thereof according to the format of the report key command of ATAPI or SCSI, and transmits the same to the authentication object A:2.

12) Transmission process of challenge key

The challenge key is formed in the same manner as that in "9) Formation of the challenge key 1" and stored in the address of the "challenge key information 51 issued from its own side". Next, the combination key is loaded into the shift registers 109a to 109d in the same manner as that in "7) Formation of the combination key and decoding process of the challenge key" and the challenge key is obfuscated.

If the same obfuscation key is loaded into the shift registers 109a to 109d, an obfuscated signal can be obtained as the output signal i6 when an original signal is input as the input signal i2 to the signal synthesizer 105 and a decoded (deciphered) signal can be obtained as the output signal i6 when an obfuscated signal is input as the input signal i2 to the signal synthesizer 105. This is because the result returns to the original signal when the signal of "0" or "1" is added twice as the obfuscation key signal.

After this, the obfuscated challenge key is stored in the external transfer data storing section 25 and the bit (flag) of the address of the "challenge key transmission completion information 85" is set to "1". Further, the process is returned to "8) Re-start process of generation of time-changing information".

Further, like "11) Transmission process of obfuscation key 1", the obfuscation key 1 is transmitted to the authentication object A:2 by use of the report key command.

13) Creation process of a bus key

Like "5) Reception of the obfuscated challenge key from the authentication object A:2", when the obfuscated "obfuscation key 2" is received, "6) Temporarily saving process of time-changing information" is effected, the decoding (deciphering) process of the "obfuscation key 2" is effected by use of the "challenge key information 51 issued from its own side" like "10) Obfuscation method of the obfuscation key 1", decoded obfuscation key 2 information is stored in the address of the "obfuscation key 2 information 60 issued from the other party" and the bit (flag) of the address of the "obfuscation key 2 reception completion information 90" is set to "1".

Next, the "obfuscation key 1 information issued from its own side" is input as the input signal i4 from the authentication information storing section 24 to the shift registers 109a to 109d via the bus line 26, input/output signal switching controller 106 and selector 107. The shift registers 109a to 109d are used as a temporary storing location of the "obfuscation key 1 information issued from its own side".

When the "obfuscation key 1 information issued from its own side" is filled up to the shift register 109d, the "obfuscation key 2 information issued from the other party" is input as the input signal i2 to the signal synthesizer 105 via the bus line 26 and input/output signal switching controller 106, and the obfuscation key 1 and obfuscation key 2 are combined in the signal synthesizer 105. The output signal i6 of the signal synthesizer 105 is used as the bus key and stored in the address of the "bus key information 65" of the authentication information storing section 24.

14) Obfuscation process of reproduced information

When information reproduced from the information storing medium 201 is obfuscated and transmitted, the "bus key information 65" is input as the input signal i4 from the authentication information storing section 24 to the shift registers 109 via the bus line 26, input/output signal switching controller 106 and selector 107 according to the control of the authentication process controller 22. At the-time of completion of transfer of the bus key, the selector 107 is closed and a signal is circulated in the random signal generator 104 with the bus key used as the starting point. The circulation of the signal is continued if obfuscation of the reproduced signal is continued.

Information reproduced from the information storing medium 201 is input as the input signal i2 from the data input/output interface section 30 to. the signal synthesizer 105 via the bus line 26 and input/output signal switching controller 106 and obfuscated information which is the output signal i6 of the signal synthesizer 105 is stored into the external transfer data storing section 25 via the shift registers 110d to 110a, input/output signal switching controller 106 and bus line 26.

15) Parallel processing and interruption process with respect to a plurality of authentication objects The authentication procedure with respect to one authentication object A:2 has been explained. As is clearly understood from the above explanation, since the authentication history is stored in the authentication information storing section 25 for each step, the authentication procedure can be interrupted on the way and the authentication procedure with respect to another authentication object B:3 can be effected.

[9] Authentication processing method using the network

[9-1] Authentication process on the network using TCP/IP

The authentication method on the network system is explained in "[1-4] Concrete example of information transfer in the network system". The relation between the steps of the authentication procedure flowchart shown in FIG. 5 and the communication content on the network is explained by using TCP/IP as an example of the communication protocol.

The authentication process is started from reproduced information of the information recording medium 201 in "[8] Flow of signals at the time of authentication operation", but in the authentication process on the network system, the authentication process is not started until the client (IP address and telephone number thereof) to or by whom information is distributed or collected and the content of information to be distributed and collected are informed from the network server as explained in "[1-4] Concrete example of information transfer in the network system".

[9-2] A case wherein a special client is specified by the server

In this case, since a special IP address or telephone number to be connected is specified by the client, the authentication object A:2 is previously fixed. Therefore, the "step (S106) of transmitting the value of AGID, area information and stream ID information allocated to the authentication object" of FIG. 5 is effected with respect to the previously fixed authentication object. In this case, the steps effected after this are the process for sharing the obfuscation key for acquirement of high-level security and prevention of leakage at the time of information transfer. The concrete content of the process is the same as that in "[8-3] Flow of concrete signals at the time of authentication operation".

In a case where information is transmitted to the client of the other party or information is received from the client by use of the network, information to be transferred can be easily copied in the gate way (router) on the transfer path. Therefore, it becomes extremely important to transfer information obfuscated by use of the obfuscation key which is shared for prevention of leakage and acquirement of high-level security.

[9-3] A case wherein a plurality of clients are simultaneously specified by the server In a case where a large amount of information is transmitted to a plurality of clients by use of electronic mails, a plurality of clients may simultaneously be specified by the server in some cases. If information to be transmitted is highly secret information, individual clients are considered as different authentication objects A:2 to D:5 and the authentication operation is effected by separately effecting the communications. In other casesr the same operation as that in "[9-2] A case wherein-a special client is specified by the server" is effected.

[9-4] A case wherein only the range of clients is specified by the server

In the case of TCP/IP protocol, the server stores a list of client machine names and IP addresses of clients to be communicated with the server himself in a file of "hosts". Further, the server holds a network domain which the server manages and manages the client machines contained in the network domain by use of IP addresses or the like. It is required in some-cases that the range of clients to or by which information is transmitted or received is specified instead of specifying the client of information transferring destination by the server with respect to the information recording/reproducing apparatus 1, searches for a corresponding client from the range of clients and transmits or receives information with respect to the corresponding client. At this time, as the range of clients specified by the server with respect to the information recording/reproducing apparatus 1, the "hosts" itself or an IP address list of the client machines contained in the specified domain is given.

The "step (S104) of setting an area key corresponding to an area in which the authentication object belongs" of FIG. 5 corresponds to recognition of the network domain notified by the server and extraction of an area key which is an obfuscation key previously set for each network domain. Information of the area key corresponding to the network domain is previously stored in the authentication information storing section 24 of FIG. 2.

In the authentication functional section 9, the data transfer interface section 8 having the communication function is controlled to simultaneously effect the "step (S106) of transmitting the value of AGID, area information and stream ID information allocated to the authentication object" of FIG. 5 with respect to all of the clients contained in the IP address list. Some information items relating to the content of information to be transmitted based on a different format may be transmitted to the client instead of stream ID information. If the step is effected, an answer is returned in the form of "self-request" from the client who wants to receive information in the network or the client who requires information transmission. That is, an answer comes back in the form of the "step (S107) of receiving the challenge key obfuscated from the authentication object" who is the client. In the TCP/IP protocol, since the IP address on the transmission side is always contained in the communication packet,-the authentication process controller 22 extracts the IP address of the authentication object A:2 from the received communication packet and stores the same into the authentication information storing section 24 of FIG. 2. After this, the IP address thus stored is used to effect the authentication operation with respect to the authentication object A:2. That is, all the steps effected after the "step (S108) of transmitting the "obfuscation key 1" obfuscated by use of the challenge key of the authentication object" are effected to communicate with only the client having the extracted IP address.

If a plurality of clients correspond to the "step (S106) of transmitting the value of AGID, area information and stream ID information allocated to the authentication object" and answers are sent from the plurality of clients, the clients are divided into different authentication objects B:3,, C:4, D:5 and the individual authentication operations are effected.

In order to prevent illegal coping of information and leakage of information on the way of the network, it is preferable to regard the clients as different authentication objects and separately effect the authentication operations.

The concrete content of the authentication process after the "step (S108) of transmitting the "obfuscation key 1" obfuscated by the challenge key of the authentication object" of FIG. 5 becomes basically the same as the process of "[8-3] Flow of concrete signals at the time of authentication operation".

Next, the internal construction of the information recording/reproducing section (physical series block) 200 of the information recording/reproducing apparatus 1 is explained with reference to FIG. 9.

[10] Explanation of the function of the information recording/reproducing section 200

[10-1] Basic function of the information recording/reproducing section 200

In the information recording/reproducing section 200, the following processes are effected.

⊚ A converged light spot is used to record or re-write new information on a preset position of the information recording medium 201 (containing an erasing process).

⊚ A converged light spot is used to reproduce recorded information from a preset position of the information recording medium 201.

[10-2] Basic function attaining means of the information recording/reproducing section 200

As the means for attaining the above functions, the following operations are effected in the information recording/reproducing section 200.

⊚ A converged light spot is traced along the track (not shown) on the information recording medium 201.

⊚ An amount of light of the converged light spot applied to the information recording medium 201 is changed to switch recording/reproducing/erasing of information.

⊚ A recording signal d supplied from the exterior is converted to an optimum signal so as to be recorded with high density and low error rate.

[11] Construction of the mechanism portion and operation of the detecting portion

[11-1] Basic construction of an optical head 202 and signal detecting circuit

[11-1-1] Signal detection by the optical head 202

The optical head 202 is basically constructed by a semiconductor laser which is a light source, photodetector and an objective lens although they are not shown in the drawing.

Laser light emitted from the semiconductor laser is converged on the information recording medium (optical disk) 201 by the objective lens. The laser light reflected from the light reflection film or light reflective recording film of the information recording medium (optical disk) 201 is photoelectrically converted by the photodetector.

A detection current obtained in the photodetector is subjected to current-voltage conversion and converted to a detection signal in an amplifier 213.

The detection signal is processed by a focus/track error detection circuit 217 or binary coding circuit 212. Generally, the photodetector is divided into a plurality of light detection areas to individually detect a variation in the amount of light applied to each light detection area. The operations for adding and subtracting the detection signals to detect a focus deviation and track deviation in the focus/track error detection circuit 217. A signal on the information recording medium (optical disk) 201 is reproduced by detecting a variation in the amount of reflected light from the light reflective recording film or light reflection film of the information recording medium 201.

[11-1-2] Focus deviation detecting method

As the method for optically detecting the focus deviation, one of the following methods is frequently used.

○ Astigmatism method: A method for detecting a change in the shape of the laser light applied on the photodetector by use of an optical element (not shown) for causing astigmatism arranged in the detection optical path of the laser light reflected from the light reflective recording film or light reflection film of the information recording medium (optical disk) 201. The photodetector is divided into four light detection areas by diagonal lines. A focus error detection signal is obtained by deriving a difference between the sum of the detection signals of the detection areas on one of the diagonal positions and the sum of the detection signals of the detection areas of the other diagonal position in the focus/track error detection circuit 217 for the detection signals obtained from the respective detection areas.

○ Knife-edge method: A method using a knife edge asymmetrically arranged with respect to the laser light reflected from the information recording medium 201 to shield part of the laser light. The photodetector is divided into two light detection areas and a focus error detection signal is obtained by deriving a difference between the detection signals from the light detection areas.

[11-1-3] Track deviation detecting method

The information recording medium (optical disk) 201 has a spiral track or concentric tracks and information is recorded on the track. A converged light spot is traced along the track to reproduce or record/erase information. In order to-stably trace the converged light spot along the track, it is necessary to optically detect the relative positional deviation between the track and the converged light spot. As the track deviation detecting method, the following methods are provided.

○ DPD (Differential Phase Detection) method: A variation in the intensity distribution of the laser light on the photodetector which is reflected from the light reflective recording film or light reflection film of the information recording medium 201 (optical disk) is detected. The photodetector is divided into four light detection areas by diagonal lines. A track error detection signal is obtained by deriving a difference between the sum of the detection signals of the detection areas on one of the diagonal positions and the sum of the detection signals of the detection areas of the other diagonal position in the focus/track error detection circuit 217 for the detection signals obtained from the respective detection areas.

○ Push-pull method: A variation in the intensity distribution of the laser light reflected from the information recording medium 201 on the photodetector is detected. The photodetector is divided into two light detection areas and a track error signal is obtained by deriving a difference between the detection signals from the respective light detection areas.

○ Twin-spot method: A light diffraction element or the like is arranged in the light transmission system between the semiconductor laser element and the information recording medium 201 to divide light into a plurality of wave fronts and detect a variation in the reflected light amount of ±primary diffraction light applied to the information recording medium 201. Light detection areas for separately detecting the reflected light amount of +primary diffraction light and the reflected light amount of −primary diffraction light are disposed separately from the light detection area for detection of the reproducing signal and a track error detection signal is obtained by deriving a difference between the above detection signals.

[11-1-4] Objective lens actuator structure

An objective lens (not shown) for converging the laser light emitted from the semiconductor laser element on the information recording medium 201 has such a structure as to be moved in two axial directions according to an output current of the objective lens actuator driving circuit 218. The directions of movement of the objective lens are as follows:

1) the vertical direction with respect to the information recording medium 201 for correction of the focus deviation, and 2) the radial direction of the information recording medium 201 for correction of the track deviation.

The moving mechanism of the objective lens is called an objective lens actuator, although not shown in the drawing.

As the objective lens actuator structure, the following structures are provided.

○ Axial sliding system: this is the system in which a blade integrally formed with the objective lens is moved along the central axis (shaft) and the blade is moved in a direction along the central axis to correct the focus deviation and the blade is rotated with the central axis set as a reference to correct the track deviation.

○ Four-wire system: this is the system in which the blade integrally formed with the objective lens is connected to a fixed system via four wires and the blade is moved in two axial directions by use of elastic deformation of the wires.

In either case, a permanent magnet and a coil are provided and the blade is moved by causing a current to flow into the coil connected to the blade.

[11-2] Rotation control system of the information recording medium 201

The information recording medium (optical disk) 201 is mounted on a rotating table 221 rotated by a driving force of a spindle motor 204.

The rotation speed of the information recording medium 201 is detected based on the reproduction signal obtained from the information recording medium 201. That is, a detection signal (analog signal) output from the amplifier 213 is converted into a digital signal by the binary coding circuit 212 and a signal of constant frequency (reference clock signal) is generated based on the above signal by a PLL circuit 211. An information recording medium rotation speed detection circuit 214 uses the signal to detect the rotation speed of the information recording medium 201 and outputs the value thereof.

A correspondence table indicating information recording medium rotation speeds corresponding to radial positions for reproduction or recording/erasing on the information recording medium 201 is previously recorded on a semiconductor memory 219. If a reproduction position or recording/erasing position is determined, a control section 220 refers to information of the semiconductor memory 219, sets the target rotation speed of the information recording medium 201 and notifies the value to the spindle motor driving circuit 215.

In the spindle motor driving circuit 215, a difference between the target rotation speed and the output signal (current rotation speed) of the information recording medium rotation speed detection circuit 214 is derived and the driving current corresponding to the result is supplied to the spindle motor 204 so as to control the rotation speed of the spindle motor 204 to be set at a constant value. The output signal of the information recording medium rotation speed detection circuit 214 is a pulse signal having a frequency corresponding to the rotation speed of the information recording medium 201. The spindle motor driving circuit 215 controls both of the frequency and pulse phase of the pulse signal.

[11-3] Optical head moving mechanism

An optical head moving mechanism (feeding motor) 203 for moving the optical head 202 in the radial direction of the information recording medium 201 is provided.

A rod-like guide shaft is used as a guide mechanism for moving the optical head 202 in many cases, and the optical head 202 is moved by use of friction between a bush mounted on part of the optical head 202 and the guide shaft. Further, a method using a bearing for alleviating the friction force using the rotation movement is provided.

The driving force transmission method for moving the optical head 202 can be attained by disposing a rotating motor with a pinion (rotating gear) on the fixed system and a rack which is a linear gear engaged with the pinion on the side surface of the optical head 202 although they are not shown in the drawing so as to convert the rotation movement of the rotating motor into a linear movement of the optical head 202. Further, as the other driving force transmission method, a linear motor system for disposing a permanent magnet on the fixed system and supplying a current to a coil arranged on the optical head 202 to linearly move the optical head may be used.

In either method using the rotating motor or linear motor, a current is basically supplied to the feeding motor to generate a driving force for moving the optical head 202. The driving current is supplied from the feeding motor driving circuit 216.

[12] Function of each control circuit

[12-1] Converged light spot trace control

In order to correct the focus deviation or track deviation, the objective lens actuator driving circuit 218 is used as a circuit for supplying the driving current to an objective lens actuator (not shown) in the optical head 202 according to an output signal (detection signal) of the focus/track error detection circuit 217. In order to make the movement of the objective lens responsive at high speed in the high frequency range, a phase compensation circuit for improving the characteristic according to the frequency characteristic of the objective lens actuator is contained therein.

In the objective lens actuator driving circuit 218, the following processes are effected in response to an instruction of the controller 220.

⊚ The ON/OFF process of the focus/track deviation correcting operation (focus/track loop) is effected.

⊚ The process (effected at the OFF time of the focus/track loop) for moving the objective lens at a low speed in the vertical direction (focus direction) with respect to the information recording medium 201 is effected.

⊚ The process for moving the converged light spot to the adjacent track by slightly moving the converged light spot in the radial direction (in the direction across the track) of the information recording medium 201 by use of a kick pulse is effected.

[12-2] Laser light amount control

[12-2-1] Switching process for reproduction and recording/erasing

The switching process for reproducing and recording/erasing is effected by changing the light amount of the converged light spot applied to the information recording medium 201.

Generally, the following expression is realized for the information recording medium using the phase changing system.

[light amount at the recording time]>[light amount at the erasing time]>[light amount at the reproduction time]

Generally, the following expression is realized for the information recording medium using the optical-magnetic system.

[light amount at the recording time]≈[light amount at the erasing time]>[light amount at the reproduction time]

In the case of optical-magnetic system, the recording and erasing operations are controlled by changing the polarity of an external magnetic field (not shown) applied to the information recording medium 201 at the time of recording/erasing.

At the time of information reproduction, a constant light amount is continuously applied to the information recording medium 201.

When new information is recorded, an intermittent light amount in a pulse form is superimposed on the light amount at the time of reproduction. When the semiconductor laser element emits pulse-like light with a large light amount, the light reflective recording film of the information recording medium 201 is partially optically changed or deformed to form a recording mark. When information is written on the already recorded area, the semiconductor laser element is also driven to emit pulse-like light.

When already recorded information is erased, a constant amount of light larger than that at the time of reproduction is continuously applied. When information is continuously erased, the amount of light applied is set back to that at the time of reproduction for each specified period, for example, for each sector unit and reproduction of information is intermittently effected in parallel with the erasing process. The track number and address of the track to be intermittently erased are reproduced and the erasing process is effected while confirming that no error of the erasing track occurs.

[12-2-2] Laser light emission control

A photodetector for detecting the emitted light amount of the semiconductor laser element is contained in the optical head 202 although not shown in the drawing. In a semiconductor laser driving circuit 205, a difference between the output (detection signal of the emitted light amount of the semiconductor laser element) of the photodetector thereof and a light emission reference signal generated from a recording/reproduction/erasing control waveform generating circuit 206 is derived and a driving current is fed back to the semiconductor laser based on the result.

[13] Various operations of the control system of the mechanism portion

[13-1] Start control

When the information recording medium (optical disk) 201 is mounted on the rotating table 221 and the start control is effected, the process is effected according to the following procedure.

1) A target rotation speed is supplied from the controller 220 to the spindle motor driving circuit 215 and a driving current is supplied from the spindle motor driving circuit 215 to the spindle motor 204 to start the rotation of the spindle motor 204.

2) At this time, a command (execution instruction) is issued from the controller 220 to the feeding motor driving circuit 216 and a driving current is supplied from the feeding motor driving circuit 216 to the optical head driving mechanism (feeding motor) 203 to move the optical head 202 to the innermost peripheral position of the information recording medium 201. It should be confirmed here that the optical head 202 exceeds the area on which information of the information recording medium 201 is recorded and is set in the inner portion.

3) When the rotation speed of the spindle motor 204 has reached the target rotation speed, the status (status report) thereof is issued to the controller 220.

4) A current is supplied from the semiconductor laser driving circuit 205 to the semiconductor laser element in the optical head 202 according to the reproduction light amount signal supplied from the controller 220 to the recording/reproducing/erasing control waveform generating circuit 206 to start laser light emission.

* The optimum amount of light applied at the time of reproduction is different according to the type of the information recording medium (optical disk) 201. At the starting time, the amount of applied light is set to the smallest value.

5) The objective lens actuator driving circuit 218 effects the control operation according to a command from the controller 220 so that the objective lens (not shown) in the optical head 202 will be set to a position farthest apart from the information recording medium 201 and then slowly moved towards the information recording medium 201.

6) At this time, the focus deviation amount is monitored by use of the focus/track error detection circuit 217, the status is issued when the objective lens comes to a position near the focused position and the present status is notified to the controller 220.

7) When the controller 220 receives the notification, it issues a command to the objective lens actuator driving circuit 218 to set the focus loop into the ON state.

8) The controller 220 issues a command to the feeding motor driving circuit 216 with the focus loop kept in the ON state and slowly moves the optical head 202 to the external peripheral portion of the information recording medium 201.

9) At this time, the reproduction signal from the optical head 202 is monitored, and the movement of the optical head 202 is stopped when the optical head 202 reaches the recording area on the information recording medium 201, and a command for setting the track loop into the ON state is issued to the objective lens actuator driving circuit 218.

10) The "optimum light amount at the time of reproduction" and "optimum light amount at the time of recording/erasing" recorded on the internal peripheral portion of the information recording medium (optical disk) 201 are reproduced and the information is recorded into the semiconductor memory 219 via the controller 220.

11) Further, in the controller 220, a signal set according to the "optimum light amount at the time of reproduction" is supplied to the recording/reproducing/erasing control waveform generating circuit 206 to re-set the emission light amount of the semiconductor laser element at the time of reproduction.

12) The light emission amount of the semiconductor laser element at the time of recording/erasing is set according to the "optimum light amount at the time of recording/erasing" recorded in the information recording medium 201.

[13-2] Access control

[13-2-1] Reproduction of information of access destination on the information recording medium 201

Information indicating the content and location of information recorded on the information recording medium 201 is different depending on the type of the information recording medium 201 and the information is generally stored in the following location in the information recording medium 201:

⊚ directory management area: information is collectively recorded on the internal peripheral portion or external peripheral portion of the information recording medium 201; or ⊚ navigation pack: information which is contained in VOBS (video object set) in conformity with data structure of PS (program stream) of MPAG2 and indicates the recording location of a next image is recorded.

When specified information is reproduced or recorded/erased, information in the above area is first reproduced and the access destination is determined based on the information thus obtained.

[13-2-2] Rough access control

The radial position of the access destination is derived by calculation in the optical head 220 and a distance with respect to the present position of the optical head 202 is derived.

Speed curve information indicating the shortest time for the traveling distance of the optical head 202 is previously recorded in the semiconductor memory 219. The controller 220 reads out the information and controls the movement of the optical head 202 according to the speed curve by the following method.

A command is issued from the controller 220 to the objective lens actuator driving circuit 218 to set the track loop into the OFF state and then the feeding motor driving circuit 216 is controlled to start to move the optical head 202.

When the converged light spot crosses the track on the information recording medium 201, a track error detection signal is generated in the focus/track error detection circuit 217. The relative speed of the converged light spot with respect to the information recording medium 201 can be detected by use of the track error detection signal.

In the feeding motor driving circuit 216, a difference between the relative speed of the converged light spot obtained from the focus/track error detection circuit 217 and the target speed information sequentially supplied from the controller 220 is derived and the result thereof is fed back to the driving current to the optical head driving mechanism (feeding motor) 203 to move the optical head 202.

Friction force is always applied between the guide shaft and the bush or bearing as described in "[11-3] Optical head moving mechanism". When the optical head 202 is moved at high speed, the friction force acts, but at the starting time of movement and immediately before stop, the optical head 202 moves at slow speed and the static friction occurs. At this time, since relative friction force is increased (particularly, immediately before stop), the current amplification factor (gain) of the current supplied to the optical head driving mechanism (feeding motor) 203 is increased according to the command from the controller 220.

[13-2-3] Dense access control

When the optical head 202 reaches the target position, a command is issued from the controller 220 to the objective lens actuator driving circuit 218 to set the track loop into the ON state.

The converged light spot is traced along the track on the information recording medium 201 to reproduce the address or track number of a traced portion.

The present converged light spot position is derived based on the address or track number of the traced portion and a difference in the track number from the target position is calculated in the controller 220 and the number of tracks necessary for the movement of the converged light spot is. notified to the objective lens actuator driving circuit 218.

When one set of kick pulses are generated in the objective lens actuator driving circuit 218, the objective lens is slightly moved in the radial direction of the information recording medium 201 to move the converged light spot to the adjacent track.

The track loop is temporarily set into the OFF state in the objective lens actuator driving circuit 218, and after kick pulses are generated by a number of times corresponding to information from the controller 220, the track loop is set into the ON state again.

After completion of the dense access, the controller 220 reproduces information (address or track number) in the position traced by the converged light spot and confirms that the target track is accessed.

[13-3] Continuous recording/reproducing/erasing control

Figure 9:
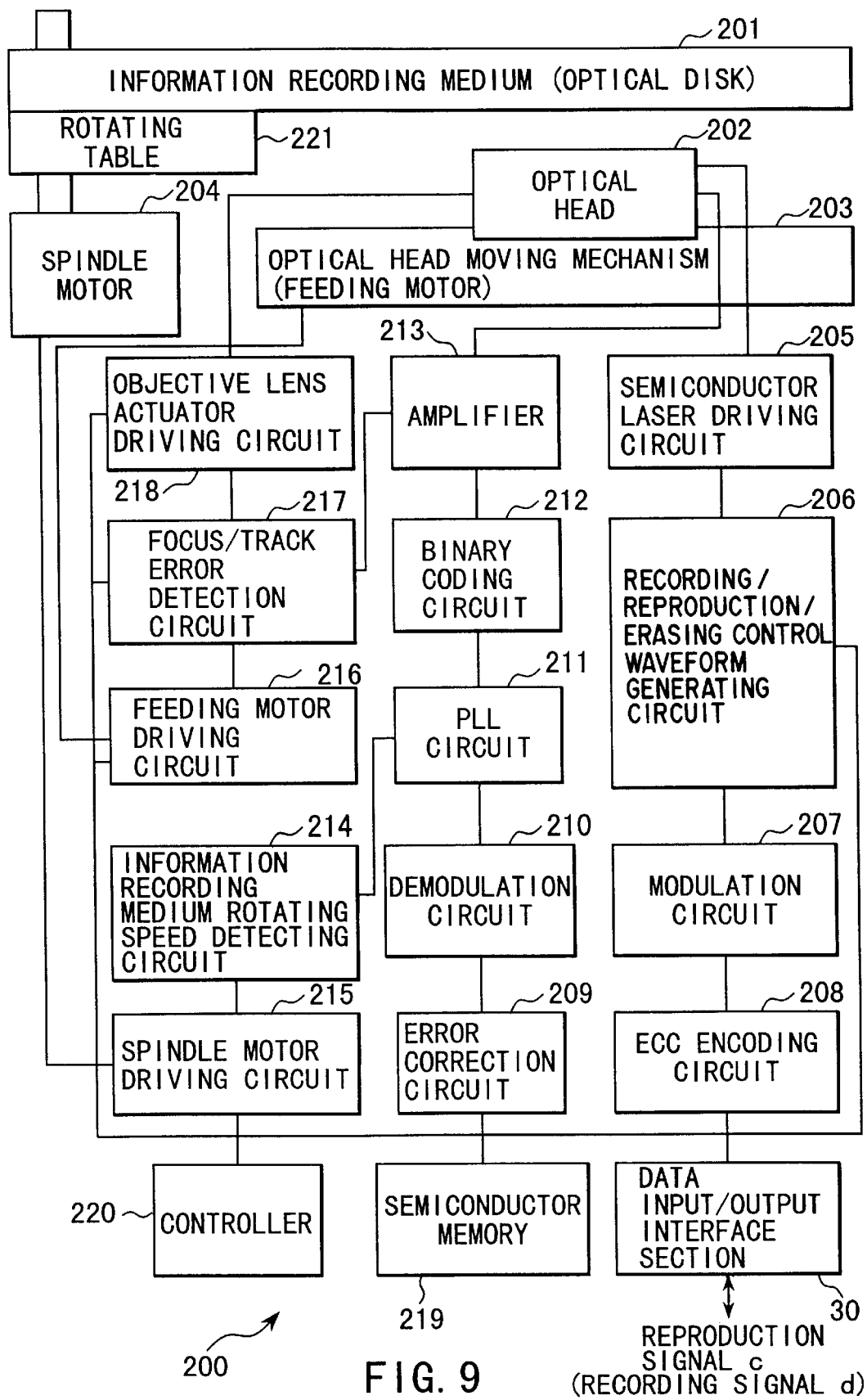
FIG. 9 is a block diagram showing the construction of an information recording/reproducing section in the information recording/reproducing apparatus.

As shown in FIG. 9, a track error detection signal output from the focus/track error detection circuit 217 is input to the feeding motor driving circuit 216. The controller 220 effects the control operation so that the track error detection signal will not be used in the feeding motor driving circuit 216 at the time of "start control" and "access control" as described before.

After it is confirmed that the converged light spot has reached the target position by access, part of the track error detection signal is supplied as a driving current to the optical head driving mechanism (feeding motor) 203 via the motor driving circuit 216 in response to a command from the controller 220. The control operation is continuously effected while the continuous reproduction or recording/erasing process is being effected.

The information recording medium 201 is mounted with its central position slightly eccentrically set from the central position of the rotating table 221. When part of the track error detection signal is supplied as the driving current, the whole portion of the optical head 202 slightly vibrates due to the eccentricity.

When the reproducing or recording/erasing process is effected for a long period of time, the converged light spot position is gradually moved outwardly or inwardly. When part of the track error detection signal is supplied as the driving current to the optical head driving mechanism (feeding motor) 203, the optical head 203 is gradually moved outwardly or inwardly accordingly.

Thus, the load of the objective lens actuator for correction of the track deviation can be alleviated and the track loop can be stabilized.

[13-4] Termination control

In order to terminate the operation after a series of processes are completed, the process is effected according to the following procedure.

1) A command for setting the track loop into the OFF state is issued from the controller 220 to the objective lens actuator driving circuit 218.

2) A command for setting the focus loop into the OFF state is issued from the controller 220 to the objective lens actuator driving circuit 218.

3) A command for terminating light emission of the semiconductor laser element is issued from the controller 220 to the recording/reproducing erasing control waveform generating circuit 206.

4) "0" is notified as the reference rotation speed to the spindle motor driving circuit 215.

[14] Flow of a recording signal/reproducing signal to the information recording medium

[14-1] Signal format recorded on the information recording medium 201

In order to satisfy the following three requirements for the signal recorded on the information recording medium 201, "addition of error correction function" and "signal conversion (signal modulation/demodulation) for recording information" are effected in the information recording/reproducing section (physical-series block) 200 as shown in FIG. 9.

◎ Correction of a recording information error caused by a defect on the information recording medium 201 is made possible.

◎ A DC component of the reproduced signal is set to "0" to simplify the reproduction processing circuit.

◎ Information is recorded on the information recording medium 201 with maximum possible density.

[14-2] Flow of the signal at time of recording

[14-2-1] ECC (Error Correction Code) adding process

Information which is desired to be recorded on the information recording medium 201 is input to the data input/output interface section 30 as a recording signal d in the form of live signal. The recording signal d is recorded in the semiconductor memory 219 as it is and then the ECC adding process is effected in an ECC encoding circuit 208 as follows.

An example of the ECC adding method using a product code is explained below.

The recording signal d is sequentially arranged for every 172 bytes on each row in the semiconductor memory 219 and one set of ECC block is constructed by 192 rows. An inside code PI of 10 bytes is calculated for each row of 172 bytes for the live signal (recording signal d) in one set of ECC block constructed by "rows: 172×columns: 192 bytes" and additionally recorded in the semiconductor memory 219. Further, an outside code PO of 16 bytes is calculated for each column in the unit of bytes and additionally recorded in the semiconductor memory 219.

In an example wherein information is recorded on the information recording medium 201, information is recorded in one sector of the information recording medium 201 in the unit of 2366 bytes in total for 12 rows each containing the inside code PI and one row of the outside code PO (2366= (12+1)×(172+10)).

In the ECC encoding circuit 208, when addition of the inside code PI and outside code PO is completed, a signal is read out from the semiconductor memory 219 for every 2366 bytes of one sector and transferred to a modulation circuit 207.

[14-2-2] Signal modulation

In order to set a DC component (DSV: Digital Sum Value) of the reproduced signal closer to "0" and record information on the information recording medium 201 at high density, signal modulation which is conversion of the signal format is effected in the modulation circuit 207.

A conversion table indicating the relation between the original signals and signals after modulation is stored in the modulation circuit 207 and demodulation circuit 210. A signal transferred from the ECC encoding circuit 208 is divided into a plurality of bits according to the modulation system and converted into another signal (code) while referring to the conversion table.

For example, when 8/16 modulation (RLL(2,10) code) is used as the modulation system, two types of conversion tables are present and the reference conversion table is adequately changed to set the DC component (DSV: Digital Sum Value) after modulation closer to "0".

[14-2-3] Generation of recording waveform

When a recording mark is recorded on the information recording medium (optical disk) 201, the following two types of recording systems are generally provided.

○ Mark-length recording system: "1" comes at the front-end position and rear-end position of the recording mark; and ○ Inter-mark recording system: the central position of the recording mark coincides with the position of "1".

In the case of the mark-length recording system, it is necessary to form a long recording mark. In this case, if recording light is continuously applied for a preset period of time, a recording mark is formed in a "raindrop" form in which only the latter portion has a large width because of the heat storage effect of the light reflective recording film of the information recording medium 201. In order to solve this problem, a plurality of recording pulses are used or a recording waveform is changed in a stepwise form when the long recording mark is formed.

In the recording/reproducing/erasing control waveform generating circuit 206, the recording waveform as described above is formed according to the recording signal supplied from the modulation circuit 207 and is transmitted to the semiconductor laser driving circuit 205.

[14-3] Flow of the signal at the time of reproduction

[14-3-1] Binary coding/PLL circuit

A signal on the information recording medium 201 is reproduced by detecting a variation in the light amount reflected from the light reflective recording film or light reflection film of the information recording medium (optical disk) 201 as described in "[11-1-1] Signal detection by the optical head 202". A signal obtained from the amplifier 213 takes an analog form. The signal is converted into a binary digital signal constructed by "1" and "0" by use of a comparator in the binary coding circuit 212.

A reference signal used at the time of information reproduction is extracted from the thus reproduced signal in the PLL circuit 211. The PLL circuit 211 contains a variable frequency oscillator. The frequencies and phases of a pulse signal (reference clock) output from the oscillator and an output signal of the binary coding circuit 212 are compared and the results of comparison are fed back to the oscillator output.

[14-3-2] Signal demodulation

A conversion table indicating the relation between the modulated signals and the signals after demodulation is stored in the demodulation circuit 210. The signal is restored to an original signal while referring to the conversion table according to the reference clock obtained in the PLL circuit 211. The restored (demodulated) signal is recorded in the semiconductor memory 219.

[14-3-3] Error correction process

An erroneous portion is detected for the signal recorded in the semiconductor memory 219 by use of the inside code PI and outside code PO and a pointer flag of the erroneous portion is set.

Then, a signal in the erroneous portion is corrected according to the error pointer flag while reading out the signal from the semiconductor memory 219, the inside code PI and outside code PO are removed from the signal and then the signal is transferred to the data input/output interface section 30.

A signal supplied from the ECC encoding circuit 208 is output from the data input/output interface section as a reproduction signal c.

Figure 10:
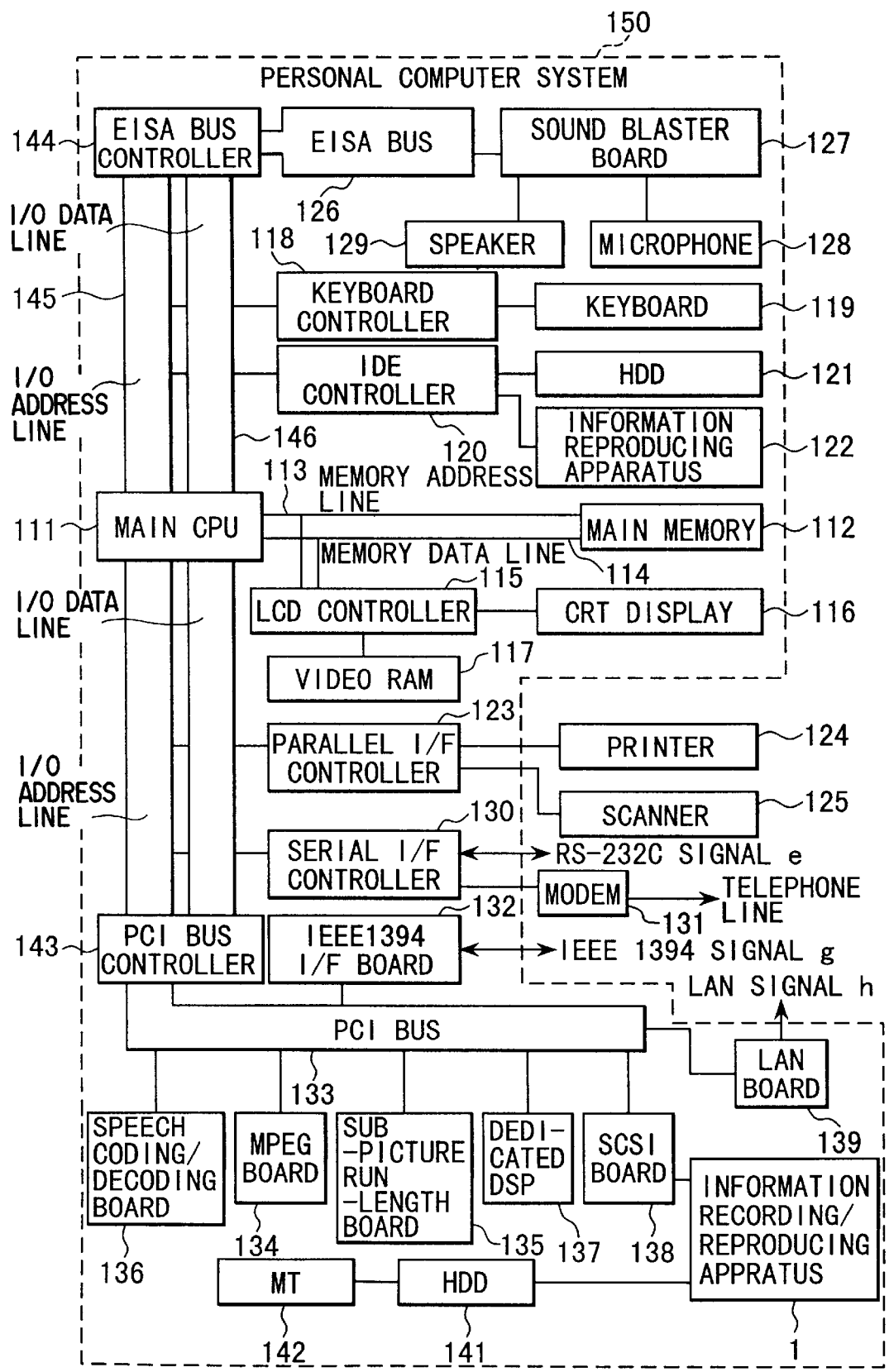
FIG. 10 is a block diagram showing the construction of a personal computer system.

The construction of a personal computer system using the information recording/reproducing apparatus 1 is shown in FIG. 10.

In this case, the data transfer interface section 8 corresponds to the interface circuit for SCSI or ATAPI provided in the information recording/reproducing apparatus 1, information reproducing apparatus 122 or the like and the external data transfer interface section 7 corresponds to a SCSI board 138, IDE controller 120, or IEEE1394 I/F board 132.

[15] Explanation of the internal construction of a general personal computer system 150

[15-1] Data/address line directly connected to a main CPU 111

The main CPU 111 in the personal computer 150 includes a memory data line 114 for directly input or output information with respect to a main memory 112, and a memory address line 113 for designating the address of information recorded in the main memory 112. The execution process of the main CPU 111 proceeds according to the program loaded in the main memory 112. Further, the main CPU 111 transfers information with respect to various controllers via an I/O data line 146 and specifies a controller of the information transferring destination and the content of information to be transferred by address designation of an I/O address line 145.

[15-2] CRT display control and keyboard control

An LCD controller 115 for controlling the display content of a CRT display 116 exchanges information with respect to the main CPU 111 via the memory data line 114. Further, in order to realize the high resolution and abundant display colors, a video RAM 117 is provided as a memory exclusively used for the CRT display 116. The LCD controller 115 can directly receive information from the main memory 112 via the memory data line 114 to display an image on the CRT display 116.

Ten key information input via a keyboard 119 is converted by a keyboard controller 118 and input to the main CPU 111 via the I/O data line 146.

[15-3] Control system of built-in type HDD/information reproducing apparatus

In the optical information reproducing apparatus 122 such as a CD-ROM drive/DVD-ROM drive or HDD 121 contained in the personal computer system 150, an IDE interface is used in many cases. Reproduction information from the HDD 121 or information reproducing apparatus 122 or recording information into the HDD 121 is transferred to the I/O data line 146 via the IDE controller 120.

Particularly, when the HDD 121 is used as a boot disk, the main CPU 111 accesses the HDD 121 at the starting time of the personal computer system 150 and necessary information is transferred to the main memory 112.

[15-4] Serial/parallel interface with exterior

A serial line and parallel line are prepared for information transfer with respect to the external device of the personal computer system 150.

A parallel I/F controller 123 for controlling the parallel line as is represented by "centro" is used to directly drive a printer 124 or scanner 125 without using a network, for example. Information transferred from the scanner 125 is transferred to the I/O data line 146 via the parallel I/F controller 123. Further, information transferred on the I/O data line 146 is transferred to the printer 124 via the parallel I/F controller 123.

For example, when information of the video RAM 117 which is displayed on the CRT display 116 or specified information in the main memory 112 is printed, the information is first transferred to the I/O data line 146 via the main CPU 111, protocol-converted in the parallel I/F controller 123 and then output to the printer 124.

As to the serial information output to the exterior, the information transferred by the I/O data line 146 is protocol-converted by the serial I/F controller 130 and output as an RS-232C signal e, for example.

[15-5] Function extension bus line The personal computer system 150 has various bus lines for function extension. A desktop personal computer has a PCI bus 133 and EISA bus 126 as bus lines in most cases. Each bus line is connected to the I/O data line 146 and I/O address line 145 via a PCI bus controller 143 or EISA bus controller 144. Various boards connected to the bus lines are divided into boards exclusively used for the EISA bus 126 and boards exclusively used for the PCI bus 133. Since the PCI bus 133 is relatively suitable for high-speed transfer, the number of boards connected to the PCI bus 133 is larger in FIG. 9. However, this is not limitative, and if the boards exclusively used for the EISA bus 126 are used, for example, a LAN board 139 or SCSI board 138 can be connected to the EISA bus 126.

[15-6] Explanation of schematic function of various boards connected to the bus line ◎ Sound blaster board 127:

A speech signal input via a microphone 128 is converted into digital information by the sound blaster board 127 and input to the main memory 112, HDD 121 or information recording/reproducing apparatus 1 via the EISA bus 126, I/O data line 146 and processed therein.

When it is desired to listen to the music or speech, the user specifies the file name recorded in the HDD 121, 141, information reproducing apparatus 122 or information recording/reproducing apparatus 1, then a digital sound source signal is transferred to the sound blaster board 127 via the I/O data line 146, EISA bus 126, converted into an analog signal and output from a speaker 129.

◎ Exclusive-use DSP 137:

When it is desired to effect a specified process at high speed, the DSP 137 board exclusively used for the process can be connected to the bus line.

◎ SCSI interface:

The SCSI interface is often used for input/output of information with respect to the external memory device. The protocol conversion or transfer information format conversion for transferring SCSI format information input or output with respect to the external memory device such as an information backup MT (magnetic tape) 142, external stationary HDD 141, information recording/reproducing apparatus 1 to the PCI bus 133 or EISA bus 126 is effected in the SCSI board 138.

◎ Board exclusively used for information compression/expansion:

Multimedia information such as speech, still picture or moving picture is compressed and recorded on the HDD 121, 141, or information recording/reproducing apparatus 1 (information reproducing apparatus 122).

Information recorded on the HDD 121, 141, information recording/reproducing apparatus 1, or information reproducing apparatus 122 is expanded and displayed on the CRT display 116 or activates the speaker 129. Further, a speech signal input via the microphone 128 is compressed and recorded on the HDD 121, 141, or information recording/reproducing apparatus 1.

Various exclusive-use boards have the information compression/expansion function. The operation of compressing/expanding music or speech signal is effected by a speech coding/decoding board 136., the operation of compressing/expanding a moving picture (video image) is effected by an MPEG board 134, and the compressing/expanding operation of sub-picture. (sub-video image) is effected by a sub-picture run-length board 135.

[16] Connection of the personal computer system 150 with the external network

[16-1] Network connection using the telephone line

When it is desired to transfer information to the exterior via the telephone line f, a modem 131 is used. That is, in order to connect the telephone line to a desired destination, an NCU (Network Control Unit) transmits a telephone number of the destination to the telephone exchange via the telephone line f although not shown in the drawing. When the telephone line is connected, the serial I/F controller 130 effects the transfer information format conversion and protocol conversion for information on the I/O data line 146. An RSC-232C signal of digital signal obtained as the result of conversion is converted into an analog signal by the modem 131 and then transferred to the telephone line f.

[16-2] Network connection using IEEE1394

When multimedia information such as speech, still picture or moving picture is transferred to an external device (not shown), an IEEE1394 interface is adequately used.

In the case of speech or moving picture, if necessary information cannot be transmitted within a preset period of time, the movement of the picture is intermittent or the speech is interrupted. In order to solve the problem, IEEE1394 uses an isochronous transfer system in which data transfer is completed for every 125 $\mu$s. In IEEE1394, the isochronous transfer and normal asynchronous transfer are mixedly used, but the upper limit of the asynchronous transfer time of one cycle is set to 63.5 $\mu$s at maximum. If the asynchronous transfer time is excessively long, the isochronous transfer cannot be ensured. In IEEE1394, a SCSI command (instruction set) can be used as it is.

The process of automatically setting of topology such as node setting, information format conversion and protocol conversion for isochronous transfer is effected for information transferred via the PCI bus 133 by an IEEE1394 I/F board 132.

Thus, the IEEE1394 I/F board 132 has not only a function of transferring information held in the personal computer system 150 to the exterior as an IEEE1394 signal g, but also a function of converting the IEEE1394 signal g transferred from the exterior and then transferring the converted signal to the PCI bus 133.

[16-3] Network connection using LAN

For local area information communication in a specified area such as a company, government office or school, a LAN signal h is input or output with the LAN cable used as a medium although not shown in the drawing.

TCP/IP, NetBEUI are present as the communication protocol using LAN and have inherent data packet structures (information format structures) corresponding to the protocols. The LAN board 139 effects the communication procedure with the exterior corresponding to various protocols and information format conversion with respect to information transferred on the PCI bus 133.

As an example, the procedure and information transfer path in a case wherein specified file information recorded in the HDD 121 is converted into a LAN signal h and transferred to an external personal computer, EWS or network server (not shown) are explained. By the control of the IDE controller 120, a file directory recorded in the HDD 121 is output, and the main CPU 111 records the file list of the result in the main memory 112 and displays the same on the CRT display 116. When the user inputs a file name which he wants to transfer by use of the keyboard 119, the content thereof is recognized by the main CPU 111 via the keyboard controller 118. When the main CPU 111 informs the IDE controller 120 of the file name to be transferred, the HDD 121 determines and accesses the internal information recording location and reproduced information is transferred to the I/O data line 146 via the IDE controller 120. After file information is input from the I/O data line 146 to the PCI bus controller 143, the information is transferred to the LAN board 139 via the PCI bus 133. The LAN board 139 establishes a session with the transfer destination by a series of communication processes, then receives file information from the PCI bus 133, converts the information into a data packet structure according to the protocol to be transferred, and transfers the converted information as a LAN signal h to thee exterior.

[17] Information transfer from the information reproducing apparatus or information recording/reproducing apparatus (optical disk device)

[17-1] Standard interface and information transfer path

In a case where the information reproducing apparatus 122 which is an optical disk device exclusively used for reproduction such as a CD-ROM, DVD-ROM and the information recording/reproducing apparatus 1 which is a recordable and reproducible optical disk device such as a DVD-RAM, PD, MO are contained in the personal computer system 150, "IDE", "SCSI", and "IEEE1394 " are present as a standard interface.

Generally, the PCI bus controller 143 and EISA bus controller 144 have a DMA therein. It is possible to transfer information between the blocks without using the main CPU 111 by the control of the DMA.

For example, when information of the information recording/reproducing apparatus 1 is transferred to the MPEG board 134, the process of the main CPU 111 is only to issue a transfer instruction to the PCI bus controller 143 and the information transfer management is left to the DMA of the PCI bus controller. As a result, at the time of actual information transfer, the main CPU 111 can execute another process in parallel without being obstructed by the information transfer process.

Likewise, when information recorded in the information reproducing apparatus 122 is transferred to the HDD 141, the main CPU 111 only issues a transfer instruction to the PCI bus controller 143 or IDE controller 120 and the information transfer management is left to the DMA of the PCI bus controller 143 or DMA of the IDE controller 120.

[17-2] Authentication function

As described above, for the information transfer process with respect to the information recording/reproducing apparatus 1 or information reproducing apparatus 122, the information transfer management is effected by the DMA of the PCI bus controller 143, EISA bus controller 144 or IDE controller 120. However, the actual transfer process is effected by the authentication functional section of the information recording/reproducing apparatus 1 or information reproducing apparatus 122.

In the DVD system such as the DVD video, DVD-ROM or DVD-R, a bit stream of video, audio is recorded in the MPEG2 Program stream format and an audio stream, video stream, sub-picture stream, private stream and the like are mixedly recorded. The information recording/reproducing apparatus 1 separately extracts the audio stream, video stream, sub-picture stream, private stream and the like from the program stream at the time of information reproduction and selectively transfers them to the speech coding/decoding board 136, MPEG board 134 or sub-picture run-length board 135 via the PCI bus 133 without using the main CPU 111.

Likewise, the information reproducing apparatus 122 separately extracts various stream information items from the program stream reproduced therefrom and selectively transfers the individual stream information items to the speech coding/decoding board 136, MPEG board 134 or sub-picture run-length board 135 via the I/O data line 146, PCI bus 133 without using the main CPU 111.

Like the information recording/reproducing apparatus 1 and information reproducing apparatus 122, the speech coding/decoding board 136, MPEG board 134 or sub-picture run-length board 135 itself has authentication function therein. Prior to information transfer, the information recording/reproducing apparatus 1, information reproducing apparatus 122 and the speech coding/decoding board 136, MPEG board 134, sub-picture run-length board 135 authenticate each other via the PCI bus 133 (and I/O data line 146). After completion of the mutual authentication, video stream information reproduced in the information recording/reproducing apparatus 1 and information reproducing apparatus 122 is transferred only to the MPEG board 134. likewise, audio stream information is transferred only to the speech coding/decoding board 136. Further, a still picture stream is transferred to the sub-picture run-length board 135 and the private stream or text information is transferred to the main CPU 111.

Figure 11:
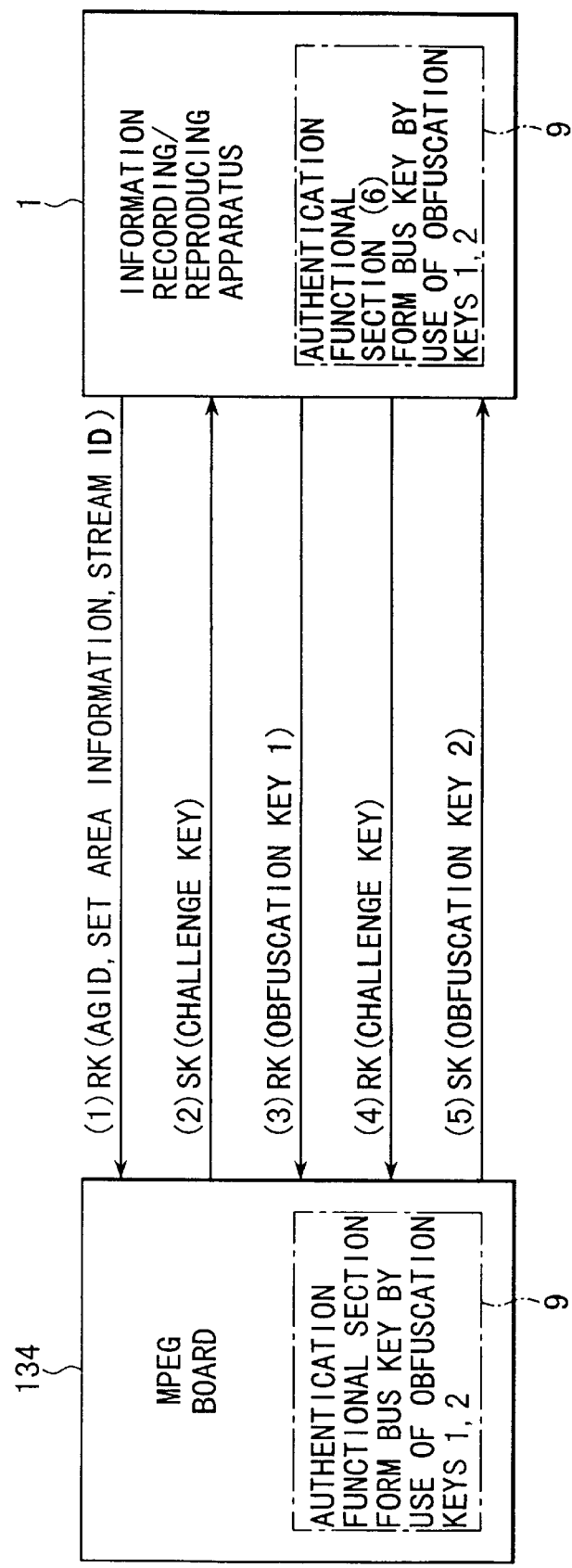
FIG. 11 is a diagram showing transfer be data between an MPEG board and the information recording/reproducing apparatus.

Next, data transfer between the information recording/reproducing apparatus 1 and the MPEG board 134 (authentication object 2) shown in FIG. 10 is explained with reference to FIG. 11. In this case, explanation for the PCI bus 133 and SCSI board connected between the MPEG board 134 and the information recording/reproducing apparatus 1 is omitted. Further, it is assumed that the MPEG board 134 also has an authentication functional section 9 and the authentication information recording section 24 stores information of one column.

That is, a report key command including AGID, set area information, and steam ID from the information recording/reproducing apparatus 1 is output to the MPEG board 134 (1).

The MPEG board 134 reads out a previously stored stream key and area key according to the AGID, set area information and stream ID (sub-stream ID) received, forms a challenge key A obfuscated by a combination key constructed by the readout stream key and area key, and outputs a second key command including the obfuscated challenge key A to the information recording/reproducing apparatus 1 (2).

The information recording/reproducing apparatus 1 forms a obfuscation key 1 obfuscated by use of the received challenge key A and outputs a report key command constructed by the obfuscated obfuscation key 1 to the MPEG board 134 (3).

Then, the information recording/reproducing apparatus 1 reads out the previously stored stream key and area key, forms a challenge key B obfuscated by use of a combination key constructed by the readout stream key and area key, and outputs a report key command including the challenge key B to the MPEG board 134 (4).

The MPEG board 134 outputs a second key command containing an obfuscation key 2 obfuscated by use of the received challenge key B to the information recording/reproducing apparatus 1 (5).

The information recording/reproducing apparatus 1 forms a bus key based on an obfuscation key 2 deciphered from the obfuscated obfuscation key 2 received and the above formed obfuscation key 1 (6).

Further, the MPEG board 134 forms a bus key based on an obfuscation key 1 deciphered from the obfuscated obfuscation key 1 received and the above formed obfuscation key 2 (6).

The operations (3) and (4) in the above example are explained more in detail.

For example, when an obfuscated challenge key is transmitted from the other party, that is, when a challenge key is supplied from the MPEG board 134 via the external data transfer interface section 7 and data transfer interface section 8, the challenge key is stored into the external transfer data recording section 25.

Then, an output signal of the random signal generator 104 in the obfuscating section/decoding section/time-changing information generating section 23 is used as the obfuscation key 1 and the output signal i5 from the shift registers 109*a* to 109*d* is stored into the obfuscation key 1 information 55 issued from its own side in the authentication information storing section 24 via the input/output signal switching controller 106 and bus line 26.

The following numeral of one unit from the random signal generator 104 is treated as time-changing information, that is, the output signal i5 of the shift registers 109*a* to 109*d* is registered into the timely time-changing information 39 formed by the random signal generator 104 of the authentication information storing section 24 via the input/output signal switching controller 106 and bus line 26.

Decipher of the challenge key

First, stream information 31 corresponding to information a of the authentication information storing section 24 is read out and output to the selector 107 via the bus line 26 and input/output signal switching controller 106 and supplied to the shift register 109*a*.

After transfer of the stream information 31 is completed, first area key information 35 is read out and output to the selector 107 via the bus line 26 and input/output signal switching controller 106 and supplied to the shift register 109*a*.

As a result, the stream key is input to the shift registers 109*a*, 109*b* and the first area key is input to the shift registers 109*c*, 109*d*.

At this time, formation of a combination key is completed and it is output to the signal synthesizer 105 as the output signal i5 of the shift registers 109*a* to 109*d*.

Next, the obfuscated challenge key stored in the external transfer data storing section 25 is output as the input signal i2 to the signal synthesizer 105 via the bus line 26 and input/output signal switching controller 106.

The signal synthesizer 105 decodes the challenge key obfuscated by the combination key supplied and outputs the result of decoding to the shift registers 110*d* to 110*a*.

After completion of transmission of the 56-bit challenge key from the external transfer data storing section 25, the entire portion of the decoded challenge key is input to the shift registers 110*d* to 110*a*.

After this, the challenge key output from the shift registers 110*d* to 110*a* is stored into the challenge key information 45 issued from the other party in the authentication information storing section 24 via the input/output signal switching controller 106 and bus line 26.

Then, the obfuscation key 1 information 55 issued from its own side is obfuscated by use of the challenge key information 45 issued from the other party.

The challenge key information 51 issued from its own side is read out from the authentication information storing section 24, output to the selector 107 via the bus line 26 and input/output signal switching controller 106 and supplied to the shift register 109*a*.

As a result, the challenge key information 51 issued from its own side is input to the shift registers 109*a* to 109*d*. The challenge key information 51 is output to the signal synthesizer 105 as the output signal i5 of the shift registers 109*a* to 109*d*.

Next, the obfuscation key 1 information 55 issued from its own side is read out from the authentication information storing section 24 and output to the signal synthesizer 105 via the bus line 26 and input/output signal switching controller 106 as the input signal i2.

The signal synthesizer 105 obfuscates the obfuscation key 1 information 55 received by use of the challenge key information 51 and outputs the obfuscated obfuscation key 1 to the shift registers 110*d* to 110*a*.

After this, the obfuscated obfuscation key 1 output from the shift registers 110*d* to 110*a* is stored into the external transfer data storing section 25 via the input/output signal switching controller 106 and bus line 26.

A report command or the like is added to the obfuscated obfuscation key 1 stored in the external transfer data storing section 25 and then supplied to the MPEG board 134 via the data transfer interface section 8 and external data transfer interface section 7.

Next, the timely time-changing information 39 formed in the random signal generator 104 of the authentication information storing section 24 is read out, output to the selector 107 via the bus line 26 and input/output signal switching controller 106 and supplied to the shift registers 109*a* to 109*d*.

When the entire portion of the time-changing information 39 is input to the shift registers 109*a* to 109*d*, the selector 107 is closed. As a result, the time-changing key of the random signal generator 104 is subjected to the random process.

Formation of the bus key: the bus key is formed by use of the obfuscation key 1 and obfuscation key 2.

That is, the obfuscation key 1 information 55 issued from its own side is read out from the authentication information storing section 24, output to the selector 107 via the bus line 26 and input/output signal switching controller 106 and then supplied to the shift register 109*a*.

As a result, the obfuscation key 1 information 55 issued from its own side is input to the shift registers 109*a* to 109*d*.

The obfuscation key 1 information 55 is output to the signal synthesizer 105 as the output signal i5 from the shift registers 109a to 109d.

Further, the obfuscation key 2 information 60 issued from the other party is read out from the authentication information storing section 24 and output as the input signal i2 to the signal synthesizer 105 via the bus line 26 and input/output signal switching controller 106.

The signal synthesizer 105 combines the received obfuscation key 1 information 55 and obfuscation key 2 information 60 to form a bus key and stores the output signal is of the shift registers 109a to 109d. into the bus key information 65 of the authentication information storing section 24 via the input/output signal switching controller 106 and bus line 26.

As described above, data transfer between the information recording/reproducing apparatus 1 and the respective boards 134, 135, 136 can be effected without using the main CPU 111, and the load of the main CPU 111 can be alleviated and the main CPU 111 can effect another process during the information transfer period.

Further, the obfuscating/decoding (deciphering) process can be effected in an extremely simple construction by using the random signal generator 104 using the shift registers 109a to 109d.

Since the obfuscation key is issued in the time-changing information generating section 23 in the authentication functional section 9, the mutual authentication can be easily attained without using the third party who manages the public key, that is, the mutual authentication operation can be extremely simplified and effected with high reliability by making the third party or inquiry to the third party unnecessary.

Further, by obfuscating the obfuscation key formed in the authentication functional section 9 by use of the obfuscation key supplied from the authentication object and transmitting the same to the authentication object, the reliability of obfuscation can be made extremely higher than a case wherein the public key system is used and information leakage can be prevented.

Information can be distributed to the authentication objects in parallel after authentication by identifying the authentication object according to information (stream ID) indicating the type of information added to the information from the information recording medium and, as a result, the load of each authentication object can be relatively alleviated and information can be displayed on the (TV) screen in a short period of time after reproduction of the information from the information recording medium is started and time lag can be suppressed to minimum.

Further, an authentication object can be searched for based on information to be transferred, information is supplied to candidates of the authentication object, responses are returned from the candidates, and then the mutual authentication operation is started based on the results of responses, and therefore, the authentication object can be searched for in a relatively easy method.

Since the obfuscation information storing memory is provided in the authentication functional section, the clock independent from the memory can be used so as to arrange information in order. Since obfuscation information is previously recorded in the external transfer data storing section 25 by use of the clock independent from the authentication functional section 9, the data transfer interface section 8 can effect the recording/reproducing process of information with respect to the external transfer data storing section 25 at optimum timing according to the state of the transmission line. Obfuscation information transferred with respect to the exterior is temporarily stored in the external transfer data storing section 25 and obfuscation information is independently formed by use of the inherent clock provided therein so that the adaptability at the time of protocol conversion and the flexibility for the busy state of the external communication line can be enhanced.

Further, the area key information and stream key information are previously stored in the authentication information storing section 24 and the information is used for the authentication process, and therefore, usage of the third party such as the authentication station (CA center) and the inquiry to the third party can be made unnecessary and the mutual authentication operation can be effected extremely easily with high reliability.

Since the content of information to be distributed and collected and the client (IP address and telephone number thereof) to or by whom information is distributed or collected are notified from the server and the remaining processes are left to the information recording/reproducing apparatus 1, no load is imposed on the main CPU 111 during the transfer of information and the main CPU 111 can effect another process during the transfer of information. Therefore, the high-speed operation can be attained as a system, and since input/output of information is effected by network communication between the computer and the information reproducing apparatus, the information reproducing apparatus can be disposed at a distant place from the computer and the computer can be disposed in a small space.

Further, since the information reproducing apparatus has a communication function, a small-sized PC such as a small-sized note PC having only one PCMCIA card slot can effect the information input/output process with respect to the information reproducing apparatus during communication if a communication LAN card or modem card is used. Since obfuscation information can be supplied to the information reproducing apparatus having the authentication function, copying of information on the way of the communication path and information leakage can be prevented.

Not only the communication functional section is provided, but also the authentication functional section uses the communication function of the communication functional section to effect the mutual authentication with respect to the authentication object and transfer obfuscation information so that information leakage due to copying of information on the way of the network transfer path can be prevented and high-level security can be acquired.

Since authentication histories of a plurality of authentication objects are stored in the memory, the simultaneous authentication process and transfer of obfuscation information can be effected with respect to the plurality of authentication objects by use of the time sharing process, any authentication object is not required to wait for authentication for a long time and the authentication process with respect to a plurality of authentication objects can simultaneously be effected at high speed.

Further, since a combination process of issuance of the obfuscation key, obfuscation of information and decoding (deciphering) of obfuscated information can be effected by use of one random signal generator 104 and a combination process of issuance of the obfuscation key, obfuscation of information and decoding (deciphering) of obfuscated information can be effected by use of the signal synthesizer 105, the circuit can be simplified and the cost is lowered by a combination use of functions.

Further, the authentication process can be effected between the boards of the personal computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information reproducing apparatus for reproducing information from an information recording medium, comprising:

first output means for outputting identification information to authentication objects, which are other than the information reproducing apparatus;

first reception means for receiving a first challenge key which the authentication objects output in response to the first output means, and which is obfuscated in accordance with the identification information;

second output means for outputting a first obfuscation key obfuscated based on the first challenge key received by the first reception means, and a second challenge key generated based on the identification information, said first obfuscation key and said second challenge key being supplied to the authentication objects;

second reception means for receiving a second obfuscation key which the authentication objects output in response to the second output means and which is obfuscated in accordance with a third obfuscation key;

generation means for generating a common key based on the first obfuscation key and the second obfuscation key, which is received from the second reception means and which is decoded in accordance with the second challenge key; and processing means for outputting information obfuscated in accordance with the common key generated by the generation means and supplying the information to the authentication objects, and for decoding the information from the authentication objects in accordance with the common key.

2. An information processing system for transferring information by effecting mutual authentication between a first apparatus and a plurality of second apparatuses, said first apparatus including:

first output means for outputting identification information;

first obfuscation means for obfuscating a previously-stored first obfuscation key in accordance with a first challenge key which the second apparatuses supply in response to the first output means and which is obfuscated in accordance with the identification information;

first preparation means for preparing a second challenge key in accordance with the identification information;

second output means for outputting the first obfuscation key obfuscated by the first obfuscation means and the second challenge key prepared by the first preparation means;

first decoding means for decoding a second obfuscation key, which the second apparatuses supply in response to the second output means by use of the second challenge key prepared by the first preparation means;

first generation means for generating a common key based on the first obfuscation key and the second obfuscation key decoded by the first decoding means; and first processing means for encoding or decoding information by use of the common key generated by the first generation means, and each of the second apparatuses including:

second preparation means for preparing the first challenge key in accordance with the identification information supplied from the first apparatus;

third output means for outputting the first challenge key prepared by the second preparation means;

second obfuscation means for obfuscating a previously stored second obfuscation key in accordance with the second challenge key which the first apparatus supplies in response to the third output means;

fourth output means for outputting the second obfuscation key obfuscated by the second obfuscation means;

second decoding means for decoding the first obfuscation key, which the first apparatus supplies in response to the third output means, by use of the first challenge key prepared by the second preparation means;

second generation means for generating a common key based on the first obfuscation key decoded by the second decoding means and the second obfuscation key; and second processing means for encoding information for encoding or decoding information by use of the common key generated by the second generation means.

3. An information processing method for transferring information by effecting mutual authentication between a first apparatus and a plurality of second apparatuses, said method comprising:

a first output step for causing said first apparatus to output identification information;

a first preparation step for causing second preparation means to prepare a first challenge key in accordance with the identification information;

a second output step for outputting the first challenge key prepared by the second preparation means;

a first obfuscation step for causing first obfuscation means to obfuscate a previously-stored first obfuscation key in accordance with the first challenge key;

a second preparation step for causing first preparation means to prepare a second challenge key in accordance with the identification information;

a third output step for causing first output means to output the first obfuscation key obfuscated in accordance with the second challenge key and the first obfuscation key obfuscated in the first obfuscation step;

a second obfuscation step causing the second apparatuses to obfuscate a previously-stored second obfuscation key in accordance with the second challenge key;

a fourth output step for causing the second apparatuses to output the obfuscated second obfuscation key;

a first decoding step for causing the first decoding means to decode the second obfuscation key in accordance with the second challenge key prepared in the first preparation step;

a first generation step for causing the first apparatus to generate a common key based on the first obfuscation key and the decoded second obfuscation key;

a first processing step for causing the first apparatus to encode or decode information by use of the generated common key;

a second decoding step for decoding the first obfuscation key, which the first apparatus supplies in response to the third output step, by use of the first challenge key prepared in the second preparation step;

a second generation step for causing the second apparatuses to generate a common key based on the first obfuscation key decoded by the second decoding means and the second obfuscation key; and a second processing step for causing the second apparatuses to encode and decode information by use of the generated common key.

4. An authenticating method comprising:

a first output step for outputting different identification information to a plurality of authentication objects;

a first reception step for receiving a first challenge key which the authentication objects output in response to the first output step, and which is obfuscated in accordance with the identification information;

a second output step for outputting first obfuscation keys obfuscated in different ways for the authentication objects on the basis of the first challenge key received by the first reception means, and different second challenge keys generated based on the identification information, said first obfuscation keys and said second challenge keys being supplied to the authentication objects;

a second reception step for receiving different second obfuscation keys which the authentication objects output in response to the second output step and which are obfuscated in different ways for the authentication objects in accordance with a third obfuscation key;

a generation step for generating different common keys based on the different first obfuscation keys and the second obfuscation keys, which are received in the second reception step and which are decoded in different ways in accordance with the respective second challenge keys; and a processing step for outputting information, obfuscated in accordance with the common keys generated in the generation step and corresponding to the authentication objects, and supplying the information to the respective authentication objects, and for decoding the information from the authentication objects in accordance with the common keys.

5. An authenticating method according to claim 4, wherein management is executed by allocating an ID number to each of the authentication objects and each authentication operation.

* * * * *